(12) United States Patent
Metcalf et al.

(10) Patent No.: US 6,854,642 B2
(45) Date of Patent: Feb. 15, 2005

(54) SYSTEM FOR VENDING PRODUCTS AND SERVICES USING AN IDENTIFICATION CARD AND ASSOCIATED METHODS

(75) Inventors: Jonathan H. Metcalf, Houston, TX (US); Robert J. O'Leary, Cypress, TX (US); Merlyn W. Barth, St. Louis, MO (US); Jacob H. Gunther, North Logan, UT (US); Erik S. Peterson, Cypress, TX (US); Heath W. Rogers, Bloomington, IN (US)

(73) Assignee: Chesterfield Holdings, L.L.C., Seattle, WA (US)

( * ) Notice: Subject to any disclaimer, the term of this patent is extended or adjusted under 35 U.S.C. 154(b) by 127 days.

(21) Appl. No.: 10/086,764

(22) Filed: Oct. 19, 2001

(65) Prior Publication Data

US 2003/0150907 A1 Aug. 14, 2003

(51) Int. Cl.[7] ............................................... G06F 17/00

(52) U.S. Cl. ........................ 235/375; 235/380; 235/381; 235/382; 235/383

(58) Field of Search ............................. 235/375, 380, 235/381, 382, 383, 449, 379, 487; 194/346, 205, 206, 207, 210

(56) References Cited

U.S. PATENT DOCUMENTS

| | | | |
|---|---|---|---|
| 4,230,214 A | 10/1980 | Cortez | 194/59 |
| 4,650,977 A | 3/1987 | Couch | 235/379 |
| 4,884,212 A | 11/1989 | Stutsman | 364/479 |
| 4,915,205 A | 4/1990 | Reid et al. | 194/205 |
| 4,982,072 A | 1/1991 | Takigami | 235/384 |
| 4,995,081 A | 2/1991 | Leighton et al. | 380/23 |
| 5,042,686 A | 8/1991 | Stucki | 221/13 |
| 5,091,713 A | 2/1992 | Horne et al. | 340/541 |
| 5,139,384 A | 8/1992 | Tuttobene | 414/281 |
| 5,146,067 A | 9/1992 | Sloan et al. | 235/381 |
| 5,147,021 A | 9/1992 | Maruyama et al. | 194/217 |
| 5,273,183 A | 12/1993 | Tuttobene | 221/7 |

(List continued on next page.)

FOREIGN PATENT DOCUMENTS

| | | |
|---|---|---|
| JP | 6-236477 | 8/1994 |
| JP | 8-241455 | 9/1996 |
| WO | WO 99/09508 | 2/1999 |

OTHER PUBLICATIONS

Duda, Richard, and Peter E. Hart, chapters 4, 5, 7–9 in "Pattern Classification and Scene Analysis", New York, John Wiley & Sons, 1973, 482pp.

Duda, Richard, Peter Hart, and David Stork, chapters 1, 4, and 5 in "Pattern Classification", 2nd ed., New York, John Wiley & Sons, 2001, 654pp.

International Search Report for WO 01/80066 dated Aug. 8, 2001.

International Search Report for WO 01/86385 dated Oct. 30, 2001.

*Primary Examiner*—Michael G. Lee
*Assistant Examiner*—Kimberly D. Nguyen
(74) *Attorney, Agent, or Firm*—Wong, Cabello, Lutsch, Rutherford & Brucculeri, LLP

(57) ABSTRACT

A highly integrated and flexible system for vending products and services to consumers. The system receives information in advance of the vend by having the consumer insert an identification (ID) card, preferably a driver's license, into a point-of-purchase terminal (referred to as an OSU device). The OSU device preferably contains an Optical Scanning Unit (OSU), capable of scanning the textual information on the ID card. In one embodiment, the scanned information is compared against optical templates present in the system to discern or verify the information on the ID card, and is then used by the system to enable or disable the vending transaction, and/or to allow access to several preregistered system accounts.

23 Claims, 15 Drawing Sheets

U.S. PATENT DOCUMENTS

| | | | |
|---|---|---|---|
| 5,352,876 A | 10/1994 | Watanabe et al. | 235/381 |
| 5,371,346 A | 12/1994 | Menoud | 235/381 |
| 5,386,103 A * | 1/1995 | DeBan et al. | 235/379 |
| 5,450,938 A * | 9/1995 | Rademacher | 194/206 |
| 5,450,980 A | 9/1995 | Laidlaw | 221/1 |
| 5,523,551 A | 6/1996 | Scott | 235/381 |
| 5,553,119 A | 9/1996 | McAllister et al. | 379/67 |
| 5,586,171 A | 12/1996 | McAllister et al. | 379/67 |
| 5,641,050 A | 6/1997 | Smith et al. | 194/210 |
| 5,641,092 A | 6/1997 | Scott | 221/134 |
| 5,647,505 A | 7/1997 | Scott | 221/2 |
| 5,696,908 A | 12/1997 | Muehlberger et al. | 395/239 |
| 5,722,526 A * | 3/1998 | Sharrard | 194/346 |
| 5,734,150 A | 3/1998 | Brown et al. | 235/381 |
| 5,774,365 A | 6/1998 | Ladue et al. | 364/479.07 |
| 5,819,981 A | 10/1998 | Cox | 221/2 |
| 5,859,779 A | 1/1999 | Giordano et al. | 364/479.01 |
| 5,927,544 A | 7/1999 | Kanoh et al. | 221/90 |
| 5,988,346 A | 11/1999 | Tedesco et al. | 194/217 |
| 6,032,859 A * | 3/2000 | Muehlberger et al. | 235/449 |
| 6,052,629 A | 4/2000 | Leatherman et al. | 700/241 |
| 6,072,902 A | 6/2000 | Myers | 382/167 |
| 6,078,902 A | 6/2000 | Schenkler | 705/35 |
| 6,085,888 A * | 7/2000 | Tedesco et al. | 194/217 |
| 6,085,976 A | 7/2000 | Sehr | 235/384 |
| 6,109,524 A | 8/2000 | Kanoh et al. | 235/381 |
| 6,119,932 A * | 9/2000 | Maloney et al. | 235/380 |
| 6,196,460 B1 * | 3/2001 | Shin | 235/380 |
| 6,345,263 B1 * | 2/2002 | Matsumoto et al. | 705/41 |
| 6,467,684 B2 * | 10/2002 | Fite et al. | 235/379 |

* cited by examiner

SYSTEM FOR VENDING PRODUCTS AND SERVICES USING AN IDENTIFICATION CARD AND ASSOCIATED METHODS

BACKGROUND OF THE INVENTION

The present invention relates generally to a system for vending products or services by the use of a standard ID card, such as a driver's license.

It is sometimes desirable to vend products or to provide services only after certain information has been provided by the consumer. For example, in order to vend age-restricted products, such as alcohol or cigarettes, the age of the consumer must be verified in advance of the purchase, typically by having the vendor visually check the consumer's driver's license to verify his date of birth. In another example, it may be desirable to vend gasoline to a consumer only after the validity of his driver's license has been verified.

To make the vending process more efficient, it is desirable to electronically automate the receipt of such pertinent information from the customer. But this is generally only possible if the consumer has some form of identification capable of storing such information in an electronic form. When one reviews the forms of identification typically held and carried by consumers, one finds two primary forms of identification—credit cards and driver's licenses. In this respect, "credit cards" should be understood to refer to other similar types of issued cards, such as debit cards, store-issued credit cards, bank-issued automatic teller machine (ATM) cards, and "smart cards" which contain integrated circuitry. However, both of these forms of identification have drawbacks when applied to automating the process of gathering information about the consumer in advance of the vending of products and services.

Credit cards typically contain magnetic strips or integrated circuitry that contain some amount of consumer information. However, credit cards are of limited utility in facilitating the automated information gathering process discussed above. First, not all consumers carry credit cards, especially many younger consumers. Second, the electronic information contained on credit cards is not always sufficient to allow an assessment of the propriety of vending a particular product to a given consumer. For example, credit cards typically do not contain information concerning the consumer's age or date of birth, a necessary piece of information for automating the vending of age-restricted products. Third, credit cards, especially store-issued credit cards, typically only allow for the purchase of those products or services sold by that store, and are therefore of limited utility. Fourth, the electronic information contained on credit cards is sometimes encrypted, or stored in formats unknown and undecipherable to the vendors. In short, credit cards, in their various formats, are generally not a suitable mechanism for gathering information about a consumer in advance of the vending of products and services.

Driver's licenses present an attractive means of gathering consumer information because they are widely held. However, driver's licenses, like credit cards, have historically been of limited utility for this purpose. First, driver's licenses come in many different formats, with each state issuing its own unique license. This makes automatic information gathering difficult for a vending system which is to operate on a nationwide (or international) scale. Second, not all states' driver's licenses contain a means for electronically storing information about the consumer. For example, not all states issue driver's licenses that contain a magnetic strip element. Third, even as to the driver's licenses that do contain electronic means of storing consumer information, the information may be limited, encrypted, or stored in formats unknown and undecipherable to the vendors, and thus suffer from the same problems as credit cards. Fourth, even if driver's licenses were suitable to automate the information gathering process, they lack the means for allowing consumers to pay for the purchase, and therefore have been of limited utility in automating the entire vending process.

A specific problem already mentioned is the vending of age-restricted products. Most, if not all, states impose minimum age requirements for the purchase of certain products such as alcohol, tobacco products, and other age-restricted products. In order to purchase such products, the customer traditionally must present identification to the seller to verify his or her age prior to the transaction. The inability to verify the customer's age prevents age-restricted products from being sold in vending machines in an automated fashion. This verification process is particularly problematic in the vending machine industry since vending machines, by their very nature, involve unattended point-of-purchase transactions. Some examples of prior approaches to this problem or related problems can be found in the following U.S. patents, all of which are incorporated herein by reference in their entirety: U.S. Pat. Nos. 4,884,212; 5,139,384; 5,146,067, 5,273,183; 5,352,876; 5,371,346; 5,450,980; 5,523,551; 5,641,050; 5,641,092; 5,647,505; 5,696,908; 5,722,526; 5,734,150; 5,774,365; 5,819,981; 5,859,779; 5,927,544; 5,988,346; 5,147,021; 4,982,072; 4,915,205; and 4,230,214.

Some prior art vending approaches, such as that of Sharrard, U.S. Pat No. 5,722,526, have contemplated using drivers licenses or other identification cards to verify the customer's age. In the Sharrard system, a customer inputs money into the vending machine and makes his or her selection. Thereafter, the customer is prompted to input an identification card such as a state government issued identification card or a driver's license containing the customer's birth date. The vending machine either optically reads the written birth date on the face of the card, or reads the birth date data from a magnetic strip contained on the back of the card. A processor unit compares this data with the present date that is keyed into the vending machine by its operator, and determines whether the customer is of a sufficient age to purchase the product.

Sharrard's disclosure notwithstanding, it is difficult to implement Sharrard's technique for age verification. As noted previously, not all driver's licenses contain magnetic strips, and even for those that do, age data may not be present on the strip or may be difficult to extract. Further, despite Sharrard's general disclosure of the idea of optically scanning a driver's license to extract age data, such a process is not disclosed or enabled in Sharrard, but is merely noted as a good idea.

Some prior art approaches such as U.S. Pat. No. 5,927,544, issued to Kanoh, suggests that age information can be "recorded on the [credit] card" to verify a vending customer's age for the purpose of vending age-restricted products, see Kanoh, Col. 4, 11. 55–58, but the present inventors submit that such information is in fact rarely present on a standard credit card. Although consumer reporting agencies, such as TRW and Equifax, and other credit card companies such as VISA or MasterCard, store information in databases for a large number of consumers, conventional vending machines are unable to access such information to verify the age of a purchaser. Those prior art vending machines that have connectivity to such databases contemplate using the database to verify credit or password information, but do not disclose or suggest using such databases to verify age. See Kanoh, Col. 4, ll. 37–42 (noting that the microprocessor in his vending machine enables "a credit card company to check credit card numbers, personal identification code numbers, and other data via a communications link," but not mentioning age data).

What is needed is a highly flexible system for vending products and services that (1) can be implemented on a nationwide (or international) scale, (2) is fully automated, (3) is capable of extracting necessary information from a consumer to assist in the vending process, and (4) is capable of remotely managing and updating an unlimited number of vending machines. Additionally, such a system would be further advantaged by (1) providing means for allowing for the payment of the products and services vended, (2) being implementable by making only minor modifications to otherwise standard vending equipment, and (3) having the capability to vend a wide array of products and services. Such a system is disclosed herein.

SUMMARY OF THE INVENTION

Disclosed is a highly integrated and flexible system for vending products and services to consumers. The system receives information in advance of the vend by having the consumer insert an identification (ID) card, preferably a driver's license, into a point-of-purchase terminal (referred to as an Optical Scanning Unit (OSU) device). The OSU device preferably contains an Optical Scanning Unit (OSU), capable of scanning the textual and graphical information (such as a validation seal or other picture) on the ID card. The scanned information, such as the consumer's age, is then compared against optical templates present in the system (preferably in the OSU) to discern or verify the information on the ID card, and is then used by the system to enable or disable the vending transaction.

The system preferably contains several components that may be distributed on a nationwide basis depending on the desired system functionality and geographic scope of the proposed system. To add flexibility to and to enhance the performance of the system, a protocol that allows for the OSU devices to communicate with the remainder of the system has been developed and is disclosed. Additionally, optical character recognition (OCR) algorithms have been developed and are disclosed to facilitate the analysis of the ID cards, a process that presents special problems not encountered in OCR analysis generally. Furthermore, a design for an OSU, capable of reading and interpreting optical data and magnetic strip data, is disclosed.

In a related embodiment, the disclosed system allows a consumer's ID card to act as a smart card useable for purchasing a wide array of products and services, including food, gas, money, phone service, rental cars, etc., which are sold through the OSU devices connected to the system. The system may also be used to tap into or establish consumer accounts useable for paying for system products and services. The system may be used more generally to determine information about a person or consumer who accesses the system, for example, by tapping into law enforcement or immigration status databases after OSU analysis of their ID cards. Additionally, methods are disclosed for initializing an OSU device upon its installation in the system and for configuring and/or update its functionality. Because the ID card of different states may be used on the system, the system may be implemented on a nationwide scale.

DETAILED DESCRIPTION OF PREFERRED EMBODIMENTS

Figure 1:
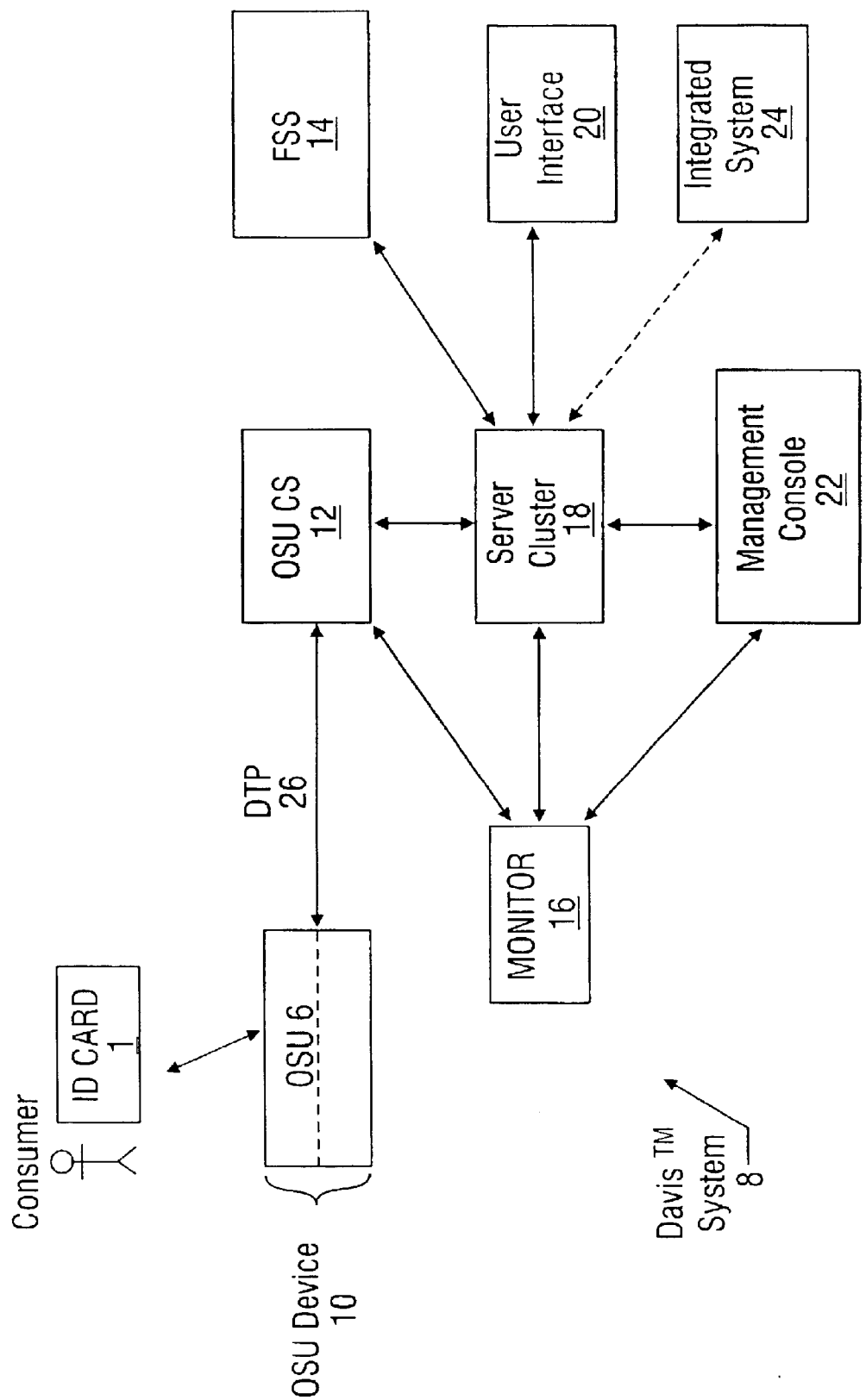
FIG. 1 shows a block diagram of the system.

In the disclosure that follows, in the interest of clarity, not all features of actual implementations are described. It will of course be appreciated that in the development of any such actual implementation, as in any such project, numerous engineering and design decisions must be made to achieve the developers' specific goals (e.g., compliance with technical- and business-related constraints), which will vary from one implementation to another. Moreover, attention will necessarily be paid to proper engineering and design practices for the environment in question. It will be appreciated that such a development effort might be complex and time-consuming, but would nevertheless be a routine undertaking for those of skill in the art given the disclosure in the present specification.

I. System Overview

Disclosed herein is a transactional, multi-tiered, networked information system, referred to as the Davis™ system. ("Davis" is an acronym for the "Detsky Age Verification Information System"). The system includes a broad range of technology and uses relating to the sale and distribution of products and/or services. Many of these uses are disclosed herein, but one skilled in the art should recognize that the system disclosed herein is capable of many uses, none of which detract from the spirit of the disclosed inventive concepts.

In a preferred embodiment of the system, the system includes a terminal accessible by a consumer, such as a vending machine, an automatic teller machine (ATM), a gas pump, a public phone, etc. This terminal contains a means for determining certain information about the customer relevant to the desired purchase. In a preferred embodiment, the terminal is able to receive a piece of identification from the consumer, such as a driver's license or other identification (ID) card.

Preferably, but not exclusively, the consumer information is read from the ID card using optical scanning technology, the specifics of which will be disclosed later in this specification. Thus, the terminal includes an optical scanning unit (OSU) for receiving the ID card and "reading" certain information from it. For example, assuming the terminal is a vending machine that vends age-restricted products such as cigarettes or alcohol, the consumer's age can be read from the ID card and processed by the system to determine the consumer's age and enable the purchase accordingly. If the terminal is a gas pump, the consumer's driver's license can be read and checked by the system to check its validity and enable the purchase of gas accordingly. If the terminal is an ATM, the consumer can use his ID card (as opposed to the more traditional, magnetic-strip debit cards issued by banks) to withdraw cash from his savings or checking account. Thus, the system allows a standard ID card, such as driver's licenses, to act as a "smart card," even if such card otherwise lacks the means for storing electronic data, such as on a magnetic strip or in integrated circuitry included on the card. These are just a few examples of the functionality of the system, all of which are made feasible by the OSU.

An overview of the components of the system 8 is shown in FIG. 1. One skilled in the art will immediately recognize that the system is suitably flexible that certain components in the system can be combined, eliminated, or added based on the desired functionality as dictated by the product or service to be marketed.

A. The OSU Device 10

The terminal with which the consumer reacts, and which contains (preferably) the optical scanning unit (OSU) 6 (see next section), is referred to generally as OSU device 10. For example, OSU device 10 might constitute a vending machine, an ATM, a public phone, a gas pump, etc.

The system 8 is capable of interfacing with several OSU devices 10, which may be connected to the system (e.g., to the OSU connection server(s) 12) by any means known in the art to connect electronic devices, such as by fixed cable, modem, wireless, or other networking means. The OSU device 10's primary function is to receive information from the consumer via its OSU 6 and to dispense products or services to the consumer (e.g., food, gas, money, etc.). Therefore, in accordance with the preferred embodiment, the consumer inserts his ID card into the OSU 6 on the OSU device 10, and a scanned image is taken of his ID card. This image may be sent to other parts of the system to be analyzed, such as the server cluster 18, using an optical character recognition scheme to be described in detail later, or the image data may be locally processed at the OSU device 10. To avoid long transmission delays, it is currently preferable to process the image within the OSU device 10 itself. However, in the future, as higher bandwidth communication systems are made available, it is contemplated that it may be preferable to process image data remotely at the servers. The OSU device 10 also performs other localized processing that need not be (or cannot be) performed by the remainder of the system.

An OSU device 10 is typically manufactured with certain factory standard functionality. For example, if the OSU device 10 is a vending machine, the machine will come pre-programmed to perform many of the functions standard to vending machines generally. However, the OSU device 10 may also be remotely configured or periodically updated as necessary either by the system 8, or locally by a portable computer or personal data assistant (PDA) device capable of interfacing with the OSU device 10. Remote updating from system 8 is preferable due to its flexibility because it allows OSU device operators and owners to control updates via a web-based administration tool accessible over the internet.

An OSU device 10 can be made to operate in "connection mode," "batch mode," or "disconnect mode," or may be attached to other non-Davis systems components if necessary or desirable. When operating in connection mode, the OSU device 10 constantly communicates with another portion of the system 8 to process certain consumer information. For example, analysis of the consumer's age, as determined optically and/or using magnetic strip data from the consumer's driver's license, may be performed remotely by the system when operating in connected mode, although this is not presently preferred as previously mentioned. Connection mode is particularly useful for processing and validating consumer credit card information, which ideally should be performed during a consumer purchase transaction.

When operating in batch mode, the OSU device 10 is not in communication with other portions of the system 8 during a consumer transaction. Instead, the OSU device 10 may be made to connect to the system 8 during off-hours to process consumer information, or to receive update instruction from the system. However, as mentioned previously, it is currently preferred that consumer information is processed directly by the OSU devices 10.

When operating in disconnect mode, the OSU device 10 is configured and updated only when removed from service and attached to a PC or other device suitable for communicating with the OSU device 10 "off line," such as a personal data assistant (PDA). In this sense, one skilled in the art should recognize that in a particular circumstance the OSU device 10 may be made to encompass all relevant functionality of the system 8, but without the benefit or necessity of communicating with a system or any other components. A good example of this would be an "age validation terminal" which could be installed in bars. In this embodiment, the consumer would simply insert his license into the terminal, most preferably in the presence of a bar attendant, at which point the terminal would perform an optical analysis of the license, and display a green light if the consumer's age is sufficient. In this embodiment, it may not be necessary to have the power of an entire networked system if the terminal itself is programmed off-hours to provide suitable functionality. In this scenario, the bar attendant is spared the potential discomfort of directly confronting the consumer about his age, and instead could rely on the age verification information provided by the terminal. Such a terminal may also prevent mistakes in age verification that otherwise might be made by the bar attendant, or may be able to determine validity concerns with the license that might not otherwise be discernable by the attendant.

The OSU device 10 may also be connected to other systems not normally included in system 8. For example, the OSU device 10 can be made to communicate with VisaNet (an on-line credit card service) to verify a consumer's credit card account information. Likewise, the OSU device 10 (or other parts of system 8) may be configured to dial into VisaNet during off-hours to reconcile transactions made during a specific day. Of course, should the OSU device 10 be made to connect directly with such third party systems, the method of communication may need to be programmed into the OSU device 10 and will not necessary be the same as the connection, batch or disconnect modes generally contemplated with respect to system 8.

B. The OSU 6

A preferred embodiment for the OSU 6 is shown in FIGS. 2–6. As will be explained later in this disclosure, OSU 6 can be incorporated into a standard or custom-made OSU device 10, such as a vending machine.

The OSU 6 in a preferred embodiment is a dual-function card reader, capable of reading both the textual and graphical data printed on the face of an ID card, and (if present) a magnetic strip. Because the OSU 6 can read both optical and magnetic data, it is capable of receiving a wealth of important data concerning the consumer from a number of different consumer ID cards, including driver's licenses and credit cards. In this regard, the OSU 6 can handle consumer transactions using ID cards that contain both optical information and magnetic information (which might be the case for some states' driver's licenses), or separate ID cards where one contains textual information and the other contains magnetic strip information. For example, the consumer's driver's license can be optically read to determine his age, and subsequently his credit card can be magnetically read to pay for a desired purchase. The preferred embodiment of the OSU 6 is therefore extremely flexible. However, it should be noted that an OSU may function according to the inventive concepts disclosed herein even if it does not perform both optical and magnetic reading functions. Thus, for a given application, only optical reading may be required (e.g., if age verification was performed using only a driver's license, but payment was to be made with cash or through debiting of an account established on the system 8), or only magnetic reading may be required. Additionally, an OSU 6 could also be easily modified by one of skill in the art to receive electrical data, e.g., as might reside in the integrated circuitry on a "smart card," in conjunction with any combination of optical and magnetic data.

Figure 2:
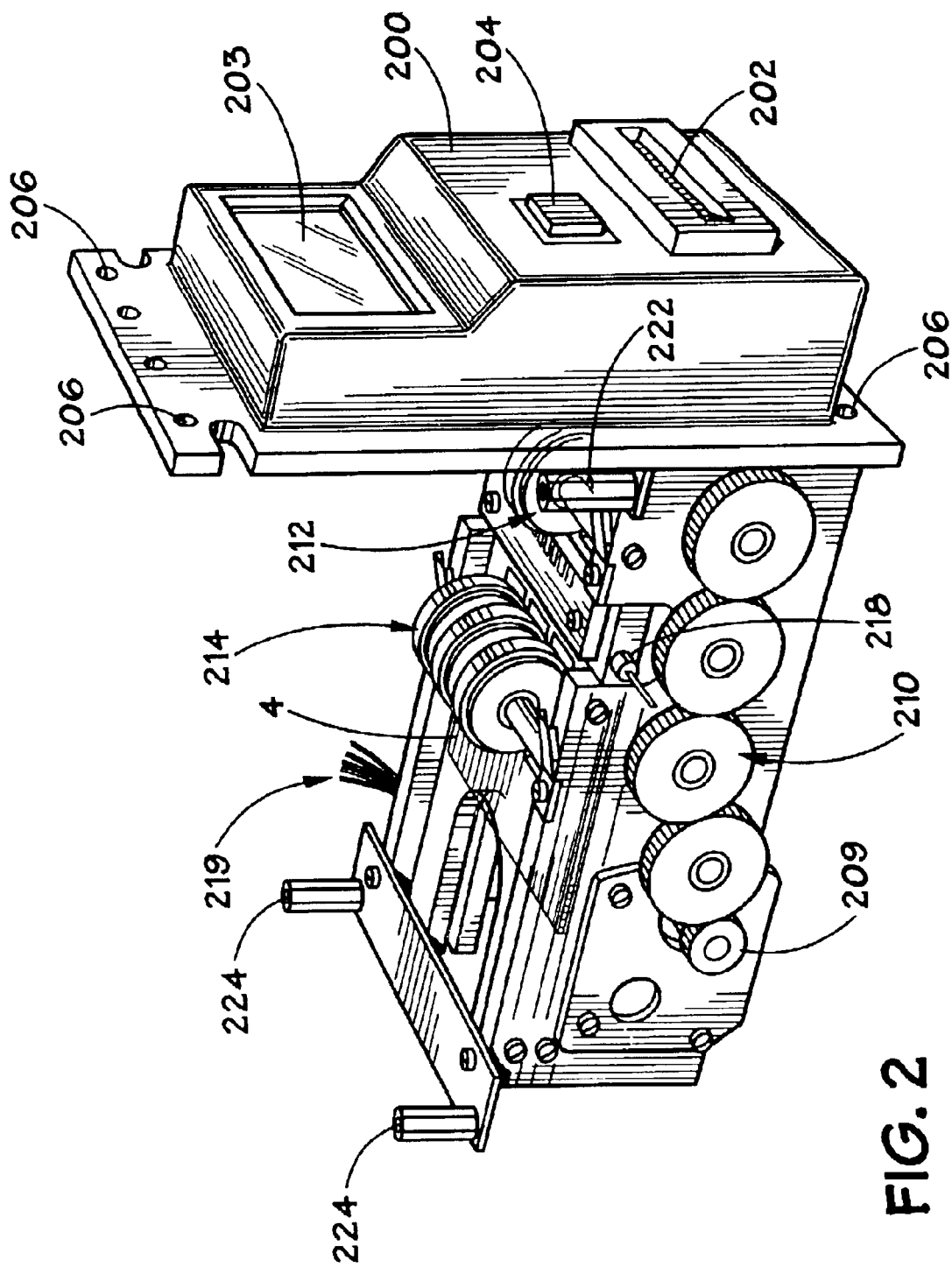
FIG. 2 shows a plan view of the optical scanning unit (OSU), including the face plate.
Figure 3:
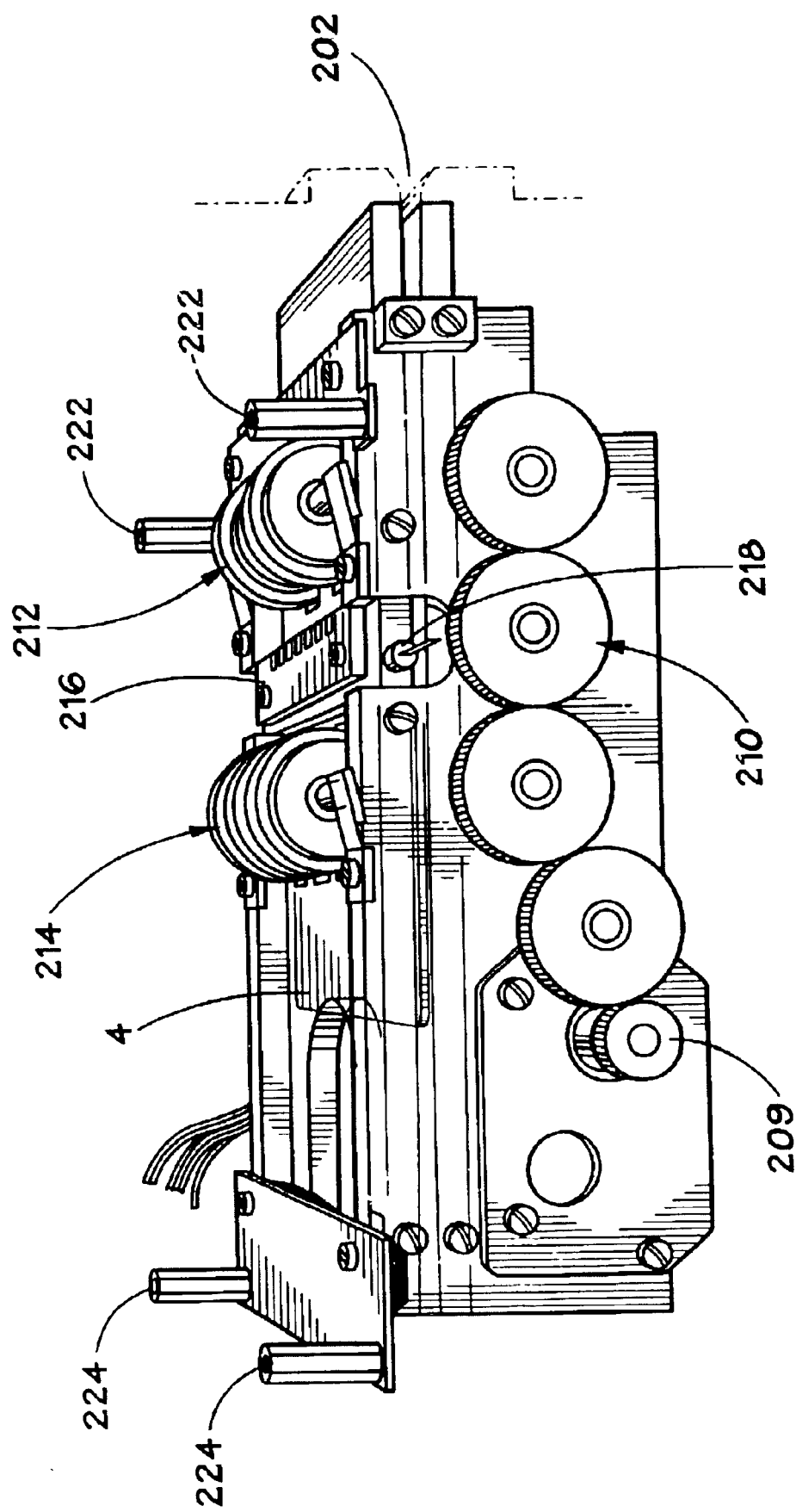
FIG. 3 show a plan view of the left side of the OSU, with the face plate removed.
Figure 4:
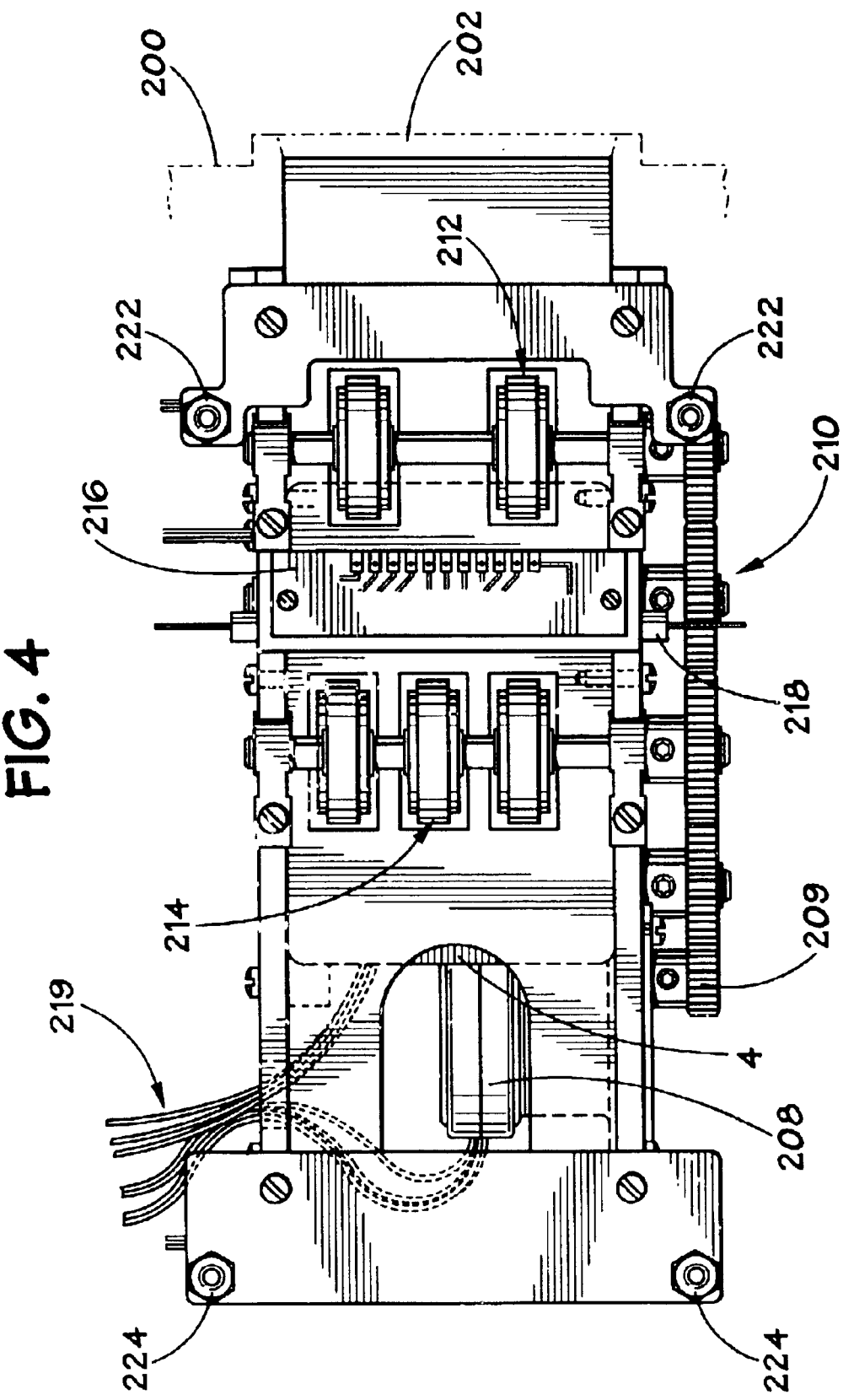
FIG. 4 show a plan view of the top side of the OSU, with the face plate removed.
Figure 5:
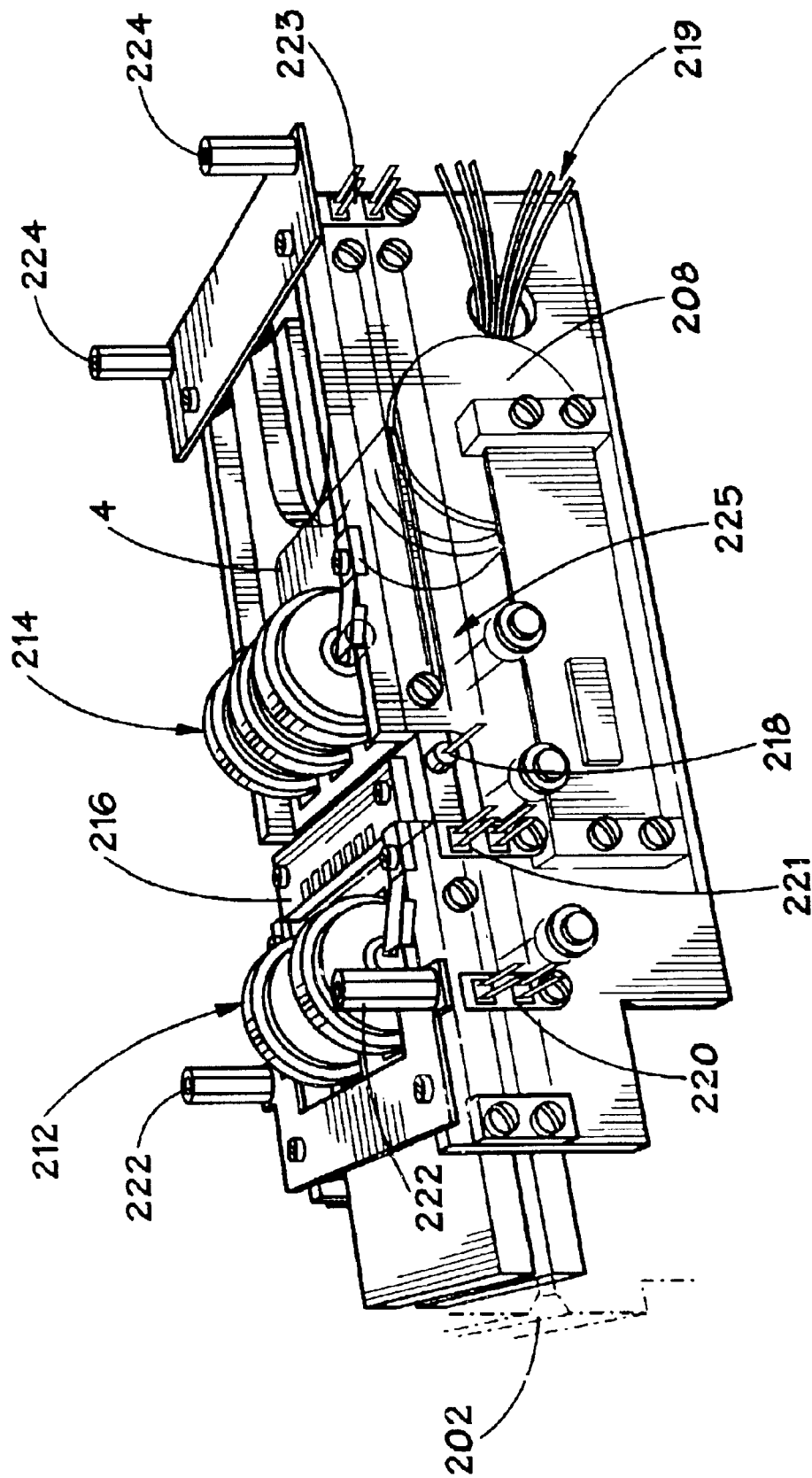
FIG. 5 show a plan view of the right side of the OSU, with the face plate removed.

FIGS. 2–5 disclose plan views of the OSU 6 as viewed from different vantage points. In FIG. 2, the face plate 200 is visible, which is the portion of the OSU 6 that a consumer would see from the outside of an OSU device 10, although this face plate 200 has been removed from the other drawings for clarity. Face plate 200 contains a bezel 202, which is essentially a slot for receiving the consumer's ID card. Also present on the face plate 200 are LCD display 203, which provides the consumer operating instructions and status information, and a cancel button/indicator light 204. LCD display 203 is preferably a 16 by 2 character display, but could be larger, or could constitute any other suitable means for displaying information, such as a cathode ray tube, a TFT flat panel display, etc. The face plate 200 also contains bolt holes 206 for mounting the OSU 6 to the face of the OSU device 10.

FIGS. 2–5 show the internal structures of the OSU 6, including stepper motor 208 with its associated gear 209, gear train 210, front and rear drives 212 and 214, charge-coupled-device (CCD) array 216, lamp 218, sensors 220, 221, and 223, magnetic head 225, and wires 219. Front and rear PC standoffs 222 and 224 are provided for mounting the printed circuit board (not shown for clarity) that contains the OSU 6's electronics, including microprocessor 230, Flash 232, and SRAM 234 (see FIG. 6). Although not shown, wires 219 are connected to a mating connector on the printed circuit board supported by the standoffs 222 and 224. The printed circuit board also contains an additional connector for connecting to the preexisting circuitry within the OSU device 10 and for obtaining power.

In operation, motor 208 controls and drives the gear train 210, which in turn controls the rubber-coated front and rear drives 212 and 214 to move the ID card 4 passed the CCD array 216 for optical reading and the magnetic head 225 for magnetic reading. A suitable motor for this purpose is part no. PF42T-48, which is manufactured by Nippon Pulse Motors and which has a full step angle of 7.5°. Lamp 218 extends through the entire width of the OSU 6, and acts to illuminate the textual and graphical information on the surface of the ID card 4 to create an image which is then picked up by the CCD array 216. A suitable lamp for use in OSU 6 is part no. BF386-20B, manufactured by JKL Components Corporation. A suitable CCD array is a 768 pixel by 1 pixel linear array part no. TSL1406, manufactured by Texas Advanced Optoelectronics Solutions, Inc., (TAOS).

Also included within the OSU 6, but not visible in FIGS. 2–5, is the printed circuit board containing electronic control circuitry including microcontroller 230, flash memory 232, and static random access memory (SRAM) 234. As previously mentioned, this printed circuit board is connected to the standoffs 222 and 224, but has been removed from the Figures for clarity. Although the memory chips 232 and 234 can be used in a particular embodiment to hold a variety of data, in a preferred embodiment flash 232 contains the configuration data for the OSU 6. Thus, flash 232 contains the program that defines the general operation of the OSU as well as contains the templates used by this program to determine the validity of the license, and to locate, for example, the date of birth information on the license. Flash 232 also contains the programs or algorithms necessary to perform optical character recognition (OCR) on the received image data, e.g., to determine and interpret the "date of birth" field of the license. SRAM 234 provides temporary storage of data obtained from the license, both optical and magnetic (if any), and provides general temporary storage for the microprocessor control system. An example of such temporary storage would be transaction information and batch information stored at the OSU prior to communication with the OSU CS 12. A suitable component for the microcontroller 230 is part no. SABC161PILFT, a 16-bit microcontroller manufactured by Siemens AG Semiconductor Division. A suitable component for flash memory 232 is part no. SST39SF040-70-4C, a 4 Megabit, 55 ns flash manufactured by Silicon Storage Technology, Inc. (SST). A suitable component for SRAM 234 is part no. TC554001AF71(Y), a 4 Megabit, 55 ns SRAM manufactured by Toshiba Corporation.

While it is currently preferable to scan, in a line by line fashion, the ID card under analysis to receive an image thereof, other suitable means of receiving an image are contemplated. For example, the OSU 6 could be fitted with a digital camera device to take a "snap shot" of the ID card, instead of scanning line by line. As used herein, "scanning" should therefore be understood as referring to line by line scanning to procure an image, or to other technologies akin to taking a picture or image of the ID card.

Figure 6:
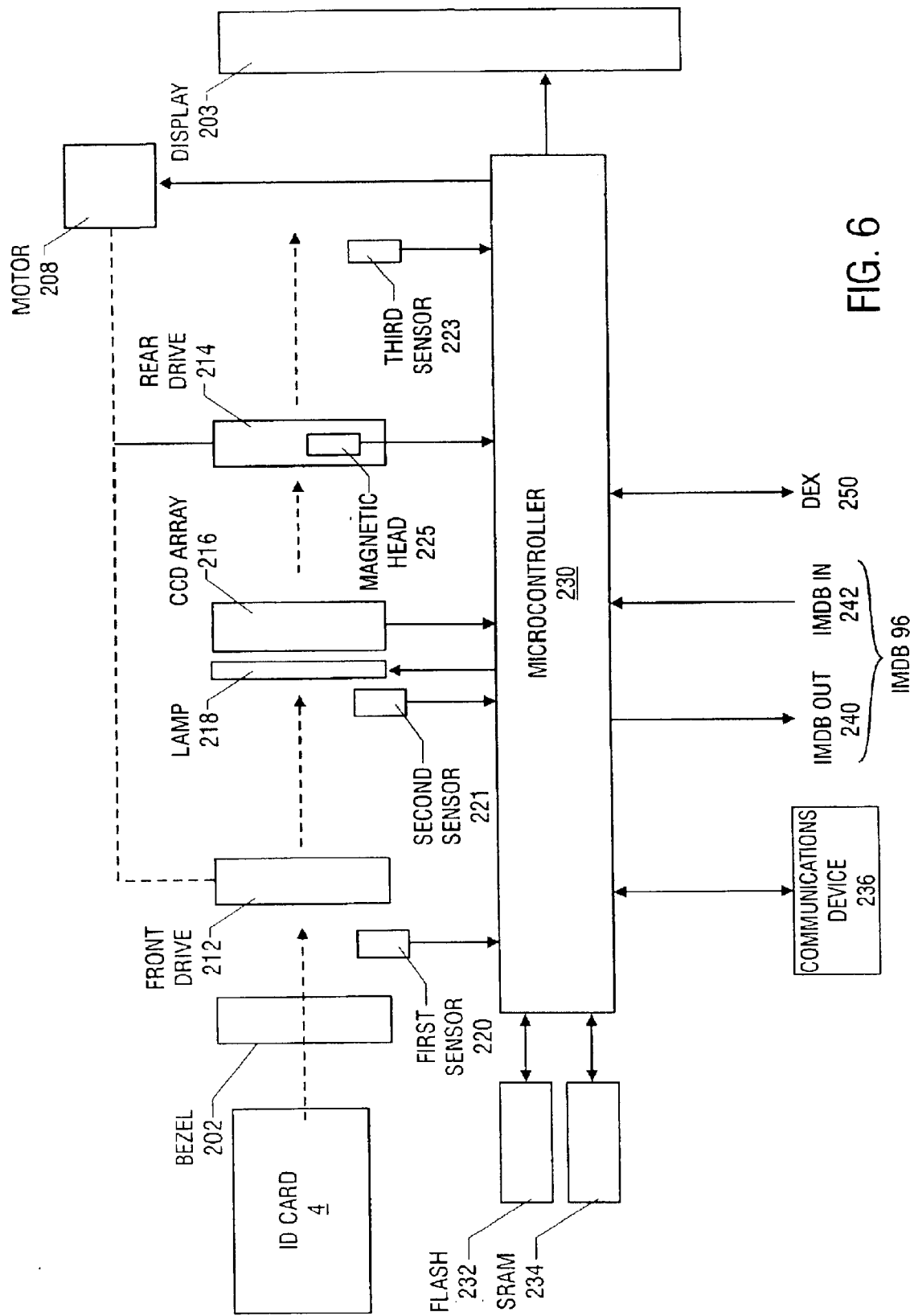
FIG. 6 shows a schematic showing the relationship of the components in the OSU.

The relation of the components in the OSU 6 is shown in schematic form in FIG. 6. Also shown are the microcontroller 230's connection to communication device 236 (such as a modem), which as previously explained communicates with an OSU CS 12, and its relation to the International Multi-Drop Bus 96, which is the bus internal to a standard vending machine, and which will be explained in further detail in a later portion of this disclosure. DEX (Direct Exchange) line 250 collects and communicates information about the vending machine in which OSU 6 is installed. DEX is well known in the vending machine arts and is based on a protocol published by the European Vending Association. In vending machines supporting DEX, DEX data stored within the vending machine may be shared with external devices such as hand held computers or the remainder of system 8. This protocol thus allows route operators or machine owners to access information such as inventory status of the vending machine, transaction data, metering data, and data pertaining to machine operation. An example of the latter would be temperature data for a machine supporting the vending of perishable food.

With reference to FIG. 6, the sequence of events occurring in the OSU 6 is exemplified for a typical transaction. In this example, it is assumed that the consumer uses a driver's license containing a magnetic strip, and that the consumer's age must be verified prior to allowing the purchase of an age restricted product from the OSU device 10. It is also assumed that payment might be made by a credit card. Of course, an actual transaction implemented with the OSU 6 need not be so limited to these assumptions.

When the consumer approaches the machine, display 203, under control of microcontroller 230, displays an instructional message, such as "please insert driver's license." The consumer complies by inserting his driver's license 4 into the bezel 202. When the front edge of the license passes first optical sensor 232, microcontroller 230 starts motor 208, which engages front drive 212 through gear 209 and gear train 210. Front drive 212 then quickly pulls the license into the OSU until the front edge of the license reaches second optical sensor 221. During the transport of the license, the license is supported underneath by idler rollers (not shown in the Figures).

Once the second sensor 221 is reached, the OSU prepares to optically scan the information on the face of the license. At this point, lamp 218 is turned on to illuminate the face of the license, and the license is slowly advanced under CCD array 216 to capture an optical image of the license. Suitably slow forward motion of the license for scanning is achieved by advancing the license 0.125 mils (one one-thousandth of an inch) per pulse of the stepper motor. Each step of the motor denotes what will ultimately be a line of single pixels in the stored driver's license image. Stepping and scanning the license occurs until the third optical sensor 223 is reached by the front edge of the license, at which point the license has been fully scanned. The line-by-line pixel data provided by the CCD array 216 is stored in SRAM 234 for further processing. The entire optical scanning process takes about 4.3 seconds, but a scanning time of 3.0 seconds is desired in a commercial embodiment. During scanning, display 203 could be made to display a message such as "scanning license, please wait" to inform the consumer of the progress of the transaction.

After a slight delay, motor 208 is again activated, but in a reverse direction, i.e., such that the license is eventually ejected from bezel 202. During this ejection process, the information on the magnetic strip is read by magnetic head 225. Ejection and magnetic reading of the license is preferably performed at the motor's maximum speed to provide a maximum magnetic signal detectable by magnetic head 225. If magnetic data is present on the license, microcontroller 230 stores this data in digital form in SRAM 234 along with the optical scanned data.

At this point, the stored optical and/or magnetic data is processed, either locally by microprocessor 230 or by other components of the system 8 through communication device 236. To the extent data is processed by other components of the system 8, the OSU 6 waits for a response from OSU CS 12. If no response is received, the display 203 might be made to state an appropriate response, such as "no server response, please try later," at which point the OSU 6 reverts to its idle or start condition.

The optical data is first compared with the templates residing in flash 232. The purpose of this comparison is to find a template match that would indicate to the microprocessor 230 in the OSU 6 that a valid driver's license has been presented for age verification and what issuing body (state or country) supplied the license. If no match is found, OSU 6 will interpret this result to mean that no age verification can be accomplished using the optical data. If however a match is found, information associated with the matching template will indicate where on the scanned image to look for detailed information concerning the owner of the license, and more specifically, his date of birth, as will be explained in more detail later. Where the decision is to be made locally at the OSU 6, the OSU 6 need only to look at the date of birth and may not need to determine other information about the consumer, such as name, driver's license number, etc. This date when compared to the current date (obtained from the real time clock in the OSU) will determine the age of the owner of the license. Preferably, optical character recognition of the name, address, driver's license number, and expiration date of the license will be sent to the server cluster 18 where additional checks can be made to further verify age, license validity, and other necessary information. Additionally, where the driver's license contains magnetic stripe data, similar information may be sent to the server cluster 18 prior to age verification, or may be used to further verify the information determined by optical analysis by comparing the optical and magnetic data.

If either the OSU 6 or other portions of the Davis system 8 determines that the consumer's age is adequate, display 203 would display an appropriate message, such as "approved," and the display 203 would thereafter prompt the consumer to make payment to the OSU device 10, such as, by displaying the message "insert cash or credit card." This step might not be necessary if the consumer has a pre-registered account on the system connected to his driver's license, in which case his account would be debited accordingly. If a pre-registered account is to be the basis for payment, the optical recognition data obtained from the license will be sent to the server cluster 18 as a "key" to access the system account.

The consumer then makes the payment, and the vending proceeds as it would in a standard vending machine. If the consumer uses a credit card to pay for the purchase, the OSU 6 scans the magnetic data using magnetic head 225, stores it in SRAM 234, and sends it to the OSU CS 12 to be processed, as will be explained in more detail later. Assuming the credit card is verified, the system will send an "approved" message to the OSU 6, which will then instruct the consumer via display 203 to "select product." If the credit card is not verified, or if insufficient credit remains on the card, the OSU 6 will be so notified by the system. In this case, the display 203 may state "not approved," and the OSU 6 will return to its idle or start condition. Additionally, the OSU 6 preferably reverts to its idle or start condition if any of the steps in the process take an inordinate amount of time.

In any event, once payment has been made in a satisfactory manner, the OSU will generate a "vend enable" signal on "IMDB out" line 240 in the vending machine to enable the purchase. After distribution of the product, the IMDB 96 internal to the vending machine will send a "vend complete" signal to microcontroller 230 on "IMDB in" line 242. At this point the batch buffer in SRAM 234 is updated, and a message such as "thank you for your purchase" is displayed by display 203 for a time.

Later, for example, during off-hours, the OSU 6 will transmit the batch buffer to the OSU CS 12 for reconciliation, a process step which is particularly useful when dealing with a transaction where payment is made by a credit card. When a credit card is presented for payment, it is presented before the product selection is made. The vending machine may have products being sold at various prices. Therefore, when the credit card is presented, the information on that card is sent to the server to obtain authorization for the purchase of unknown value. A preferable method to implement this credit authorization step is to request authorization for an amount that will allow the customer to select the highest priced item in the vending machine. Once authorization is completed, and when the customer selects a product, the price of that product is recorded in the batch buffer. This buffer, which lists all of the transactions occurring within the machine over some predetermined period of time, is transmitted to the OSU CS 12 at some time when the machine is not likely being used, say 2:00 AM. The server cluster 18 ultimately sends the batch to a credit card server (such as FSS 14 or other integrated system 24) for reconciliation, whereby the credit card processing company compares the amount authorized to the amount of the actual purchase and charges the credit card account for the actual amount of the purchase. Information concerning cash transactions and DEX information, along with the credit card information, is also used by the server cluster 18 for the generation of system or OSU device 10 reports.

As mentioned earlier, the OSU device 10 can also operate in a batch or disconnect mode, such that the OSU device is either temporarily or permanently disconnected from the system. Operation in these modes may be intentional or may be inadvertent, such as when the system is not functioning or if communication between the system and the OSU device 10 is compromised. In either of these modes, the above flow would be modified accordingly. First, age validation would have to occur locally within the OSU 6, which might increase the processing power or amount of data storage that would be necessary in the OSU device 10. (As will be explained later, optical verification of a driver's license involves the use of algorithms and comparison with image templates, which generally increase the computing power needed for the verification function).

Second, the ability to verify the validity or creditworthiness of a credit card could not be made during the process of the transaction. In this circumstance, and if the system is not responding, payment is preferably handled in two ways. First, the OSU 6 could be configured to receive only cash payments. Second, the OSU 6 could additionally be configured to receive a credit card. In this latter case, the OSU 6 is preferably configured to analyze as much information as is possible to try and validate the transaction. Thus, with the assistance of the microcontroller 230 and information about correct credit card data format stored in memory within the OSU 6, the OSU 6 assesses the form of the credit card data and the expiration date. If acceptable in format, the credit card purchase can proceed. If not acceptable, the consumer may be instructed to pay for the purchase by cash. The transaction and credit card data would be stored in the OSU 6's memory to be later sent to the system or retrieved by an operator to be processed.

C. The OSU Connection Server 12

OSU connection server (OSU CS) 12 communicates with OSU devices 10 using a bi-directional "Davis Terminal Protocol" (DTP) 26, the specifics of which are discussed ii later in this specification. Essentially, the OSU CS 12 acts as a bridge or proxy for OSU devices 10 with respect to their communication with server cluster 18. The OSU CS 12 can simultaneously handle bi-directions communication with one or many OSU devices over any transmission means capable of supporting DTP 26. One skilled will recognize that OSU CS 12 could constitute a cluster of several servers to prevent any particular server from becoming overworked and to provide redundancy in case a particular server fails. The OSU CS 12 can also be locally or geographically dispersed to enhance system reliability and robustness.

Every time an OSU device 10 queries the system, or the system provides information to the OSU device 10, an "OSU CS session" is created. In this manner, the OSU CS 12 handles communication between the OSU devices 10 and the remainder of the system. The OSU CS 12 can be any suitable server, but in a preferred embodiment constitutes any system that supports the Java 2 platform. Preferably a commercial embodiment will use an x86 based server running linux 2.4 kerual with external modems connected through standard RS232 serial ports. Although several means of communication are possible between the OSU CS 12 and the remainder of the system (e.g., server cluster 18), it is presently preferred to use Java 2 Enterprise Edition (J2EE) over a TCP/IP connection to establish this communication link.

Depending on the application, OSU CSs 12 may not be necessary, and the OSU devices 10 could instead communicate with the server cluster 18 directly or by any other system using the Davis Terminal Protocol (DTP), which will be described later, or any other suitable protocol.

D. Server Cluster 18

Server cluster 18 essentially functions as the operating system of the Davis system 8. It provides, among other things (1) services to manage the OSU devices 10 and their associated OSU CSs 12, (2) storage for data used by the system, (3) web (internet) application functionality, (4) connectivity to off-system services like VisaNet, and (5) other integrated e-business systems.

One skilled in the art will recognize that server cluster 18 can include databases for storage of necessary system and consumer data, and that such databases can be integral with or separate from the servers in the cluster. In a preferred commercial embodiment, server cluster 18 comprises (1) four Compaq Proliant systems running RedHat Linux 7.1 with the 2.4 Linux kernal, (2) two servers, each with 1 GM of RAM and 50 GB of mirrored disk storage provided hosting tasks utilizing JBOSS 3.0 J2EE protocol, and (3) two additional servers, each with 256 MB RAM, 25 GB mirrored disk storage, and dual external USRobotics modems, for providing hosting tasks to an OSU CS 12. In the preferred embodiment, the four modems are assigned to a single number call pool to which the OSU devices 10 connect. The modems preferably answer calls in a round robin fashion such that if one modem is busy another one in the pool answers the call. However, it should be recognized that while a cluster of networked servers is beneficial to handle overload and to provide redundancy in the event of server failure, server cluster 18 could constitute a single server in a given application.

E. Management Console 22

The management console 22 is essentially the terminal by which the Davis system's administrator accesses the network. In a preferred embodiment, management console 22 constitutes any suitable personal computer or workstation and provides the administrator a user interface for accessing the system. From this console 22, the administrator can list, group, and report information about the various OSU devices 10. For example, assuming the OSU devices 10 are vending machines, the administrator can determine if any of the machines are running low on product. Furthermore, console 22 can be used to configure and deploy software updates for the OSU devices 10 and/or other system components. For example, it is from this terminal that the administrator would deploy a new template specifying the configuration of a particular driver's license (e.g., the state of Texas), so that the system and the OSUs will know how to optically recognize and analyze such a license format.

In a preferred embodiment, limited system administration functionality is available to vending machine or other OSU device 10 operators. In this embodiment, each operator is assigned its own user profile and management console for logging into the system, from which they could add, edit, delete, inactivate, pulls reports on, etc., the OSU devices 10 under their control.

F. Monitor 16

Monitor 16 monitors and maintains communication with critical system functions to increase system reliability. Monitor 16 provides manual and automated means to observe system functions and respond to system errors. For example, if an OSU CS 12 or OSU device 10 ceases to function properly, monitor 16 detects this error and responds appropriately. Thus, the monitor 16 may reroute communications to a working or redundant OSU CS 12, or page the system administrator. In the event of less critical system errors, monitor 16 may simply record the systems error in a system log that may later be addressed by the administrator.

Monitor 16 registers when a component of the system has come on line. In this respect, system components may broadcast their presence on the system to be picked up by monitor 16, or the components may be configured to register themselves on monitor 16 without further assistance. Once registered and on line, components preferably "ping" monitor 16 at regular intervals to provide a "heart beat" for the system. Monitor 16 may also request a ping or may request information about system functions. For example, the monitor may request an OSU CS 12 to provide the number of active connections with various OSU devices 10 and duration of each connection. In a preferred embodiment, monitor 16 constitutes a server similar to the OSU CSs 12 as described above.

G. Financial Services System 14

Financial Services System (FSS) 14 provides the system the ability to process account transactions, i.e., the ability for consumers to access their financial accounts in order to make purchases or receive other services on the system.

Several examples exist of financials services supportable by the system. For example, FSS 14 could constitute a credit card payment service, such as VisaNet. In such an embodiment, the consumer would input their credit card into the OSU device 10 and credit for the consumer's purchase would be effectuated and processed through VisaNet. If the system contains information linking a particular ID card (e.g., a license) to a credit card, such processing may also occur by simply having the consumer enter his ID card into the system, which effectively allows the ID card to work as a credit card on the system.

Additionally, FSS 14 could constitute an aggregation of several accounts of the consumer, such as his credit/debit card accounts or checking or saving accounts. All of these accounts, if registered by the consumer on the system, may be accessible through the system 8 as part of FSS 14. This embodiment allows the system to function as an ATM, whereby a consumer enters his ID card into an OSU device 10 and can withdraw money from his account or perform other financial transactions with his accounts without using his designated bank debit card. In this embodiment, the OSU device 12 might constitute an ATM machine fitted with an OSU. Likewise, an OSU could be incorporated with cash registers or other point-of-sale machines to effectuate consumer purchases, and allow the consumer access to several of his accounts using a single ID card. Thus, by using his ID card at a point-of-sale terminal, the consumer can be presented with a list of accounts registered on the system, and may select an account to pay for the purchase.

In another embodiment, FSS 14 constitutes a Davis cash account set up by the consumer for use on the system 8. This embodiment is envisioned as being particularly useful in the marketing of low cost items such as candy bars. For such transactions, it may not be sensible to pay for the purchase with a credit card, as the credit transaction fees may be relatively expensive when compared to the cost of the item being purchased.

Using FSS 14, a consumer cash account can be established from which payment for purchases on the system will be drawn. Thus, the system could be used, again in conjunction with the FSS 14, to transfer funds from the consumer's bank account to the cash account, or the cash account could be established by other means, such as sending a check to the system administrator. Thereafter, when the consumer enters his ID card into the OSU device, credit for the purchase will be drawn from his cash account, or the OSU device 10 may present the consumer an option to either have the money so drawn or to provide cash payment to the OSU device 10. Such an embodiment is believed particularly suitable for vending machines, pay phones, slot machines, transportation ticket dispensers, stamp machines, etc. In this respect, it is important to note that the system has flexibility and utility beyond age verification. In other words, the system need not be used exclusively to vend age-restricted products, and whether age verification is required for a particular purchase transaction can be easily controlled by enabling or disabling such functionality using the system.

When dealing with consumer accounts on the Davis system, it is generally preferred that such accounts be accessible through the use of a personal identification number (PIN) to ensure security. In this regard, the OSU device 10 will contain a keyboard or other suitable means for allowing a PIN number to be entered after receipt and optical analysis of the ID card. Suitable PIN numbers may be distributed by traditional means by an administrator of the Davis system. Optionally, and more generally, a "private key" could be used to ensure security, which could comprise a PIN number, some sort of biometric input such as a finger print, a code generation device containing an internal clock and encrypted algorithms for generating an access code, etc.

H. User Interface 20

User interface 20 generally constitutes a personal computer from which registered consumers can access certain system features, and may be as numerous as the number of consumers that use the system. For example, using interface 20, a consumer can log onto the system (preferably via the web or internet) to set up a system cash account, to transfer funds between registered accounts, or to check fund balances. Interface 20 can also be used to check product availability at a particular OSU device 10, to check their statuses, e.g., whether such devices are functional at the present time, or to check for the location of OSU devices 10 connected to the system. For security reasons, it is contemplated that consumers be issued passwords and user names that enable them to log on to the system.

Suppose a consumer wishes to use his driver's license to purchase products for sale on a given Davis system. Using user interface 20, the consumer can log onto the Davis system website and register her driver's license by inputting pertinent information from the face of the card, such as name, address, license number, date of birth, etc. (The system may thereafter be made to interface with an appropriate database or other integrated system 24, e.g., the Texas Department of Transportation, to ensure that the entered consumer information is correct). Thereafter, the consumer may be notified by e-mail that the license has been registered, and may be issued a personal identification number (PIN) to use in conjunction with the license at the OSU device 10. At user interface 20, the consumer may also register certain bank accounts on the system, allow money to be transferred or deducted from those accounts, authorize payments for purchases to be made from their credit card (e.g., through FSS 14), or establish a cash account to pay for purchases made on the system. Once the service is activated in this manner, the consumer can use their driver's license to purchase products from any OSU device 10. (It should be noted that registration of the license or ID card may not be necessary for all applications, such as applications in which the consumer will pay for the purchase by standard means, or for services not requiring payment, such as emergency phone calls).

Interface 20 also preferably allows access to others who are not necessarily consumers. For example, interface 20 is contemplated as being accessible by registered operators who service and/or stock the OSU devices 10, such as vending machine product distributors. Such operators should preferably have special passwords, and may have access to more detailed information in the system not available to the general consumer. Through interface 20, an operator can, for example, (1) add, edit, or remove OSU device 10 information, (2) create an OSU device 10 configuration for remote software updates, (3) provide or retrieve pertinent system data, such as DEX data, (4) manage driver routes, (5) create financial reports, or (6) manage the inventory in the OSU devices 10.

Thus, a registered operator may essentially perform many of the same acts as system administrator, but only for the OSU devices 10 under his control. For example, suppose an operator purchases 20 OSU devices 10 to vend tobacco in a hotel or casino. After creating an on-line account by logging into a user interface 20, he can access to his home page on the system and register each of the 20 vending machines. When the registered devices call into the Davis system, they can synchronize with the operator-configured settings. For example, the devices can be directed to dial in once a week to provide DEX, audit, or reporting data. From this information the operator is able to manage inventory, add optical scanning templates so that the devices will recognize inserted ID cards, and generally control the functionality of his OSU device 10.

I. Integrated Systems 24

One skilled in the art will recognize that the system 8 could be made to interface with other integrated systems 24 to improve or enhance system performance. Examples of integrated systems 24 include VisaNet, law enforcement agencies, etc., and enable the system to act as a subscriber (i.e., to receive information from other systems), a provider (i.e., to provide information to other systems), or a transaction partner (e.g., with VisaNet). Certain systems constituting FSSs 14 may also constitute examples of integrated systems 24.

J. System Geography

It is contemplated that Davis system 8 could be deployed on a nationwide or international basis. Such flexibility is realizable because the system has the capability of recognizing ID cards issued from several different jurisdictions. In such an embodiment, it is preferred that the OSU devices 10 be located nationwide, that OSU CSs 12 be located in certain local regions (such as cities) such that they are capable of serving several different OSU devices 10 within their locales, and that the server cluster 18, monitor 16, and management console 22 be located at a "headquarter" location in the vicinity of the Davis system administrator. Of course, user interfaces 20, FSS 14, and integrated systems 22 will likely exist somewhere distant from headquarters. Smaller more regional systems are also possible, and the disclosed preferred geographical distribution of the system may be easily be modified depending on system requirements.

II. Davis Terminal Protocol (DTP)

As previously mentioned, a specialized protocol is used in the communication between the OSU devices 10 and the OSU cluster servers (OSU CS) 12 called the Davis Terminal Protocol (DTP) (see FIG. 1, element 26). After researching several available communication protocols it was determined that none of them met the requirements for the Davis system 8, such as:

leverage existing communication layers: It is foreseen that OSU devices 10 may be plugged into existing communication infrastructures such as TCP/IP, PPP, etc. DTP provides a layer of abstraction that insulates OSU device development from current protocols and their evolvement.

reliable communications: DTP has proven highly reliable, an important feature as data loss during a transaction in a Davis system is unacceptable.

full-duplex communication: DTP allows either side (i.e., the OSU device 10 or the OSU CS 12) to send or receive data.

communication initiation: In a typical transaction, the OSU device 10 will initiate communication. DTP, however, may also be used in future embodiments to allow the OSU CS 12 to initiate communication. Such two-way initiation was not well supported by existing protocols, but it achievable using DTP.

byte stream oriented: Transactions must be capable of sending any type of data such as binary, string, numeric, etc. DTP supports such flexible streaming of data.

packet oriented: Because DTP is a packet-oriented protocol, it provides flexibility with regard to the size of data to be transmitted. Therefore, larger or smaller pieces of data may be sent depending on the bandwidth available. Packet oriented communication also provides for reliable communication and assists in handling transmission errors. Thus, when smaller packets are used to transmit a single block of data, if an error occurs, only the packet containing the error needs to be sent, increasing transmission efficiency.

"lightweight": DTP transmits data with little protocol-related overhead.

simple and fast: Due to the variety of embodiments that an OSU device 10 might take, it is likely that any communication protocol to be used with it will need to be re-implemented many times and configured with different parameters depending on the data transmission requirements. It is therefore advantageous to be able to quickly implement a new device that is able to communicate with the server. While TCP/IP was thought originally to be a suitable protocol candidate, it was determined that this protocol was not suitably "lightweight," was not simple or fast to implement, and did not provide an important abstraction layer for OSU software development. DTP squarely addresses these concerns, and was therefore determined to be a suitable candidate for use in the Davis system. One skilled in the art will notice however that DTP borrows certain technical concepts from TCP/IP, but tuned in such a way to make its implementation in the Davis system optimal. (Due to the limited resources of the modem-based communication channels that are preferably used in the system, it is not feasible at this time to use the standard TCP/IP or TCP/PPP protocols that requires wider bandwidth than DHP/DMP, but this may change as technology progresses.)

In the current embodiment, the Davis system 8 uses the DTP protocol layered on top of the industry standard RS232 protocol for serial communications. DTP is itself composed of two layers: the Davis middle level protocol (DMP), and the Davis high level protocol (DHP). Written together, communication protocol for the Davis system thus consists of a DHP/DMP/RS232 stack, although any lower level communication protocol could support the DHP/DMP stack disclosed herein. It is currently preferable in a commercial embodiment to use the V22 modem protocol, and thus the entire communication stack may be written as DHP/DMP/RS232/V22 or simply DTP/V22. Later, DTP can easily be upgraded in a commercial embodiment to the DTP/TCP/IP or DTP/TCP/PPP combinations when technological advances allow.

Figure 7:
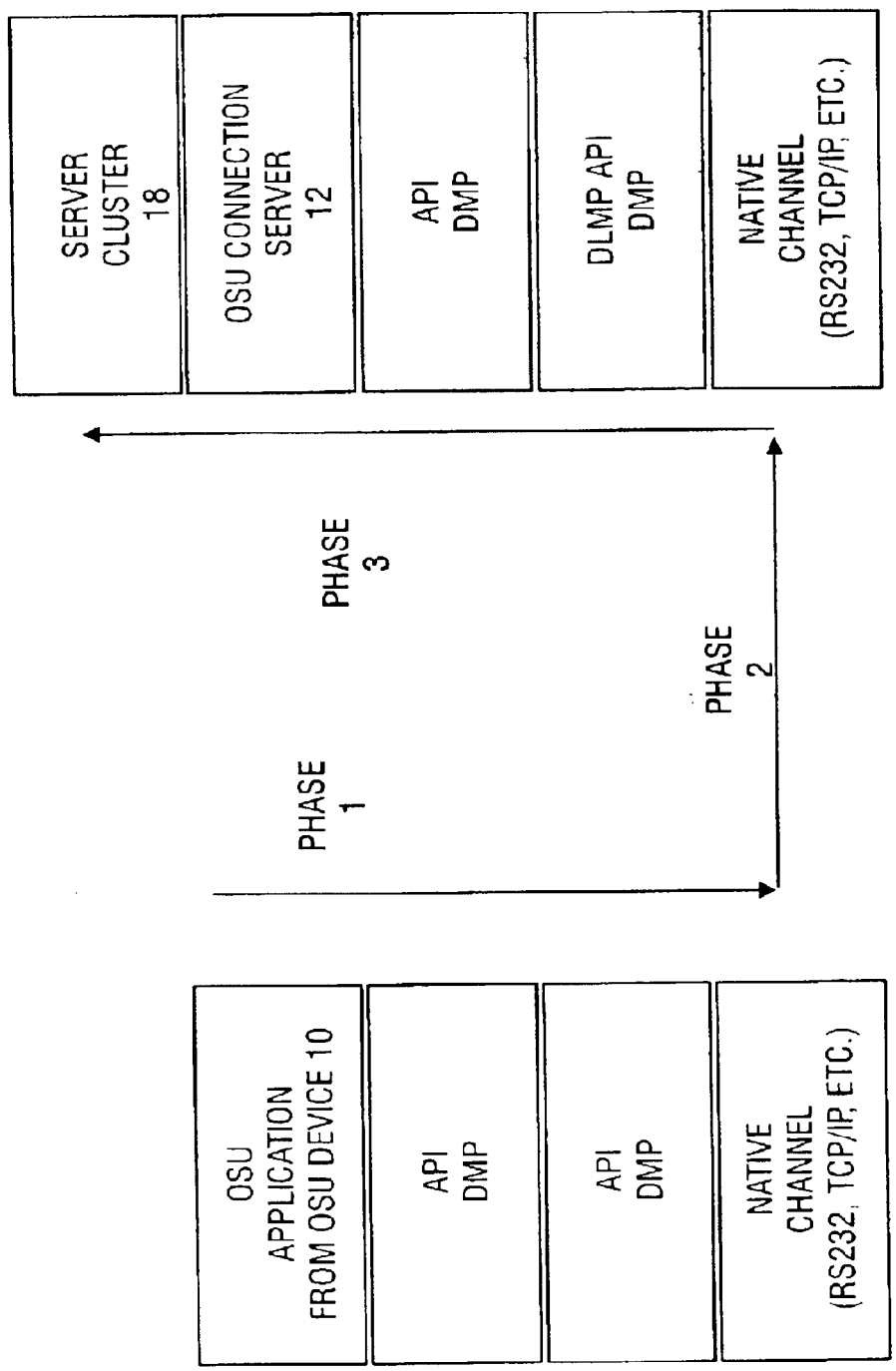
FIG. 7 shows an illustration of the interaction of the various layers utilized in the Davis Terminal Protocol.

The different layers in the DHP/DMP construction perform different functions independent of the other layers. Each layer of the protocol performs services for the layer above it and provides services to the layer below it. When two devices are communicating, each layer of the protocol stack communicates with the same layer of the protocol stack on the other device. FIG. 7 identifies three distinct communication phases that are utilized in DTP. In Phase 1, an OSU device 10 communicates with the Davis server system (i.e., either OSU CS 12 or server cluster 18) and requests one of its services. It does so by calling one of the routines available in the DHP API (application programming interface). The DHP routine in turn forwards the request to the DMP layer. The DMP layer then forwards or repackages the request on to the native communication channel such as RS232 (and preferably V22). In Phase 2, the native communication channel relays the request from the OSU Device 10 to the Davis server system. In Phase 3, the Davis server system accepts the request and forwards it on to the receiving DMP layer. The DMP layer then passes the request on to the DHP layer, followed by the OSU CS 12 proxying the request on to the server cluster 18.

The three phases will repeat, now in the reverse direction, to allow the system to send a response to the OSU device 10. While this example assumes that the OSU device 10 has made the request to the system, the system may also make requests to the OSU device 10, thus allowing for asynchronous, bi-directional communication.

The DHP and DMP provide communication services independent of one another, and hence generally provide different functionality. Preferably, DHP provides APIs such as login requests, transaction requests, and update requests. By contrast, DMP provides for data packet field and segment definitions, handshaking, and other lower level tasks.

A. DMP

DMP provides reliable, full-duplex, byte stream-oriented service. It accepts data from the DHP layer, divides DHP segments into a set of DMP segments and adds a header to each segment, and sends individual segments to the modem. If the size of a segment exceeds the maximum payload capacity, DMP divides the segment into several segments and sets the sequence number field in the header for the benefit of the receiving system. The capacity of DMP data payload varies from 0 to 255 bytes per segment. DMP is also free to retransmit a single segment of 200 bytes as two segments each containing 100 bytes of data.

When a transmitted segment is received by the other system (e.g., OSU CS 12), DMP checks the sequence number in the header to verify that number of segments that carry a particular unit of data. When the expected number of segments is received, the receiving system retains the data for analysis or other processing and sends an acknowledgment back to the sending system (e.g., OSU device 10). The acknowledgment field in the header of the acknowledgment message contains the sequence number in the received data segment. To verify that a segment was received without errors, DMP uses the checksum field, which contains the sum of all segment bytes, with the exception of the last two bytes containing the check sum.

The preferred format for the DMP data segments is shown in the below table

DMP Header Format

| Field | Size (bits) | Description |
| --- | --- | --- |
| Version | 7 | Specifies the protocol version and verifies that the sender, receivers are using a current version of the protocol. Preferably 0x01. |
| ACK Flag | 1 | 1 if the previous segment was received without errors. |
| Sequence Number | 8 | Identifies the position of the data in the senders bit stream. |
| Acknowledge Number | 8 | The number of the last received sequence. |
| Length | 8 | Specifies the length of the data in bytes. |
| Data | Varies | |
| Checksum | 16 | The sum off all the bytes in the segment (used for error correction) |

B. Handshaking

When an OSU device 10 and a server desire to communicate, they must first "handshake." DMP uses a 2-way handshake to initiate a connection, a process that ensures that both devices are ready to transmit data, and that both devices know that the other is ready to receive data before the transfer actually starts. The procedure works as follows: sending device A (e.g., OSU device 10) sends a segment to device B (e.g., OSU CS 12) wherein Sequence Number=0, and ACK_FLAG=0. When device B receives the segment from device A, and if device B is ready to communicate with A, it sends a segment to A wherein Sequence Number=0, Acknowledge Number=0, and ACK_FLAG=1. Thereafter, device A may transfer data to device B.

Note that a segment may be sent or received from either end at any time. If an acknowledgment (i.e., ACK_FLAG=1) is not received for a non-zero length segment after a timeout of 2 seconds, the segment will be retransmitted. If the segment was retransmitted 3 times and the acknowledgment was not received, the connection is terminated.

C. DHP

Like DMP segments, every DHP segment has a structure that includes a header and associated data. With respect the DHP header, the first byte (i.e., eight bits) specifies the version of DHP protocol (4 bits) and type of data (4 bits).

The next word (16 bits, or two bytes) specifies the length of the data within the segment, which preferably can be as large as 64 K bytes. The rest of bytes in the segment constitute the data. This segment structure is shown in the below table:

| DHP Header Format | | |
|---|---|---|
| Field | Size (bits) | Description |
| Version | 4 | Version of the DTP protocol. |
| Type | 4 | Type of data:<br>0-Login Request<br>1-Login Response<br>2-Transaction Request<br>3-Transaction Response<br>4-Transaction Commit<br>5-Transaction Commit Response<br>6-Update Request<br>7-Update Response<br>8-DEX Submit<br>9-DEX Response<br>10-Logoff Request |
| Length | 24 | Specifies the length of the data |
| Data | Varies | |

There are two types of DHP segments, those that store payload data in an ASCII string format and those that store data in a binary format. Binary format is a sequence of bytes used to represent any type of data, such as numbers, bit-map images, or complex data structures. String data is a sequence of bytes used to represent ASCII characters, which is a more convenient way to represent some systems data such as birth date, person name, or an ID number. An example of a string format might be "propertyName1=value1; propertyName2=value2," and a more specific example for a "Transaction Response" packet may looks like "trn=1234567; time=09/27/01; err=0", where different properties are separated by a semicolon character ';' and a property name and property value are separated by an equal sign character '='. Each of the eleven types of exemplary segments illustrated in the above table is summarized below, along with a description of their function. One skilled will realize that other segment types, carrying different forms of data for a variety of purposes, could easily be implemented, depending on the requirements of the application.

Type 0—Login Request (string packet): Before an OSU device 10 can commence a session with the system server (e.g., OSU CS 12) it must login by sending a Login Request segment. The data that accompanies this segment includes "sn," which denotes the serial number of the inquiring OSU device 10, and "rc6," which is a random number that is to be RC6 encrypted with the Davis system master key and challenge.

Type 1—Login Response (string packet): After the server receives the login request from the OSU device 10, it sends a Login Response segment. The data accompanying this segment includes "busy," which equals '1' if the server is too busy to update the client, and "rc6."

Type 2—Transaction Request (string packet): This segment is used by the OSU device 10 to send the customer credit card and/or driver license information to the server. The data accompanying this segment includes "dln," the driver's license number, "dlname," the name on the license, "dldob," the date of birth on the driver license, "dlexp," the expiration date of the license, "dlst," the state in which the license was issued, "ccn," the credit card number, and "ccexp," the credit card expiration date.

Type 3—Transaction Response (string packet): When the server receives the Transaction Request segment, and assuming for example that this segment contains credit card data, the server checks the credit card information, sends the request to VisaNet or other FSS 14, and sends a Transaction Response segment to the OSU device 10, which includes "trn," a transaction number, "time," the current time, which can be used automatically by the OSU device 10 to update its clock, and "err," an error code (optional).

Type 4—Transaction Commit (string packet): After the OSU device 10 receives the Transaction Response segment, it vends the product to the customer and sends the Transaction Commit segment to notify the server that the transaction has been committed. Data accompanying this segment includes "trn".

Type 5—Transaction Commit Response (string packet): The server sends the OSU device 10 this segment as confirmation of receipt of the Transaction Commit segment. If the OSU device 10 does not receive the Transaction Commit Response before terminating the connection to the server, it will resend the Transaction Commit again during the next session. No data accompanies the sending of this segment.

Type 6—Update Request (string packet): The OSU device 10 preferably sends this segment periodically (e.g., every 24 hours) to request configuration and software updates. Accompanying data includes "ver," which denotes the OSU configuration version.

Type 7—Update Response (binary packet): After the server receives the Update Request segment, it checks to see if the OSU device 10 needs to be updated, and if so, sends an Update Response segment containing the latest OCR templates and any other necessary OSU software. (OCR templates will be explained in a later section of this specification). Every Update Response segment constitutes a chain of one or more update units that add, update, or remove various parts of the OSU software. There are six types of units: "Font Update," which replaces the font template if it is already installed on the OSU device 10 or adds one if it doesn't exist, "Font Delete," "Header Image Update," which replaces or adds header templates, "Header Image Delete," "Form Update," which replaces or updates the form template, and "Form Delete".

Type 8—DEX Submit (binary packet): The OSU device uses this segment to periodically (e.g., every 24 hours) send DEX data to the server.

Type 9—DEX Response (string packet): The server sends this segment to the OSU device 10 to indicate that the DEX Submit segment was successfully received and saved in the database. Data accompanying this segment includes "saved," which equals '1' if the save was successful.

Type 10—Logoff Request Payload (string packet): The OSU device 10 sends this segment to notify the server that it wants to finish the current session. No data accompanies the sending of this segment.

Other segments are possible, such as segments used to update product information, such as product pricing.

D. Example of DMP Communication Protocol

As an example of the operation of DTP, including DHP and DMP, the below table provides the data packet sequence to show how two devices (A and B, preferably OSU device 10 and OSU CS 12) login and logout using DTP. In this example, serial number for device A is 987654321.

| Bytes | Protocol | Description/Data |
|---|---|---|
| \multicolumn{3}{c}{A sends Login Request packet} | | |
| 2 | DMP | DMP Version 1, ACK_FLAG = 0 |
| 0 | DMP | Sequence Number 0 |
| 0 | DMP | Acknowledge Number 0 |
| 16 | DMP | Size of payload DMP |
| 16 | DHP | DHP Version 1, Login Request Packet |
| 0 | DHP | higher bite of the offload size |
| 0 | DHP | middle bite of the offload size |
| 12 | DHP | lower byte of the offload size |
| 115 | DHP | S |
| 110 | DHP | N |
| 61 | DHP | = |
| 57 | DHP | 9 |
| 56 | DHP | 8 |
| 55 | DHP | 7 |
| 54 | DHP | 6 |
| 53 | DHP | 5 |
| 52 | DHP | 4 |
| 51 | DHP | 3 |
| 50 | DHP | 2 |
| 49 | DHP | 1 |
| 3 | DMP | higher bite of the checksum |
| 41 | DMP | lower bite of the checksum |
| B sends Login Response packet | | |
| 3 | DMP | DMP Version 1, ACK_FLAG = 1 |
| 0 | DMP | Sequence Number 0 |
| 0 | DMP | Acknowledge Number 0 |
| 4 | DMP | Size of payload DMP |
| 17 | DHP | DHP Version 1, Login Response Packet |
| 0 | DHP | higher bite of the offload size |
| 0 | DHP | middle bite of the offload size |
| 0 | DHP | lower byte of the offload size |
| 0 | DMP | higher bite of the checksum |
| 24 | DMP | lower bite of the checksum |
| A sends Logoff Request packet | | |
| 3 | DMP | DMP Version 1, ACK_FLAG = 1 |
| 1 | DMP | Sequence Number 1 |
| 0 | DMP | Acknowledge Number 0 |
| 0 | DMP | Size of payload DMP |
| 0 | DMP | higher bite of the checksum |
| 4 | DMP | lower bite of the checksum |

III. Optical Character Recognition (OCR)

As noted previously, a desirable advantage of the disclosed system is its ability to receive data from a consumer through optical, non-electronic means, e.g., from the printed text on the face of an ID card such as a driver's license. This enables the consumer's driver's license, in conjunction with the OSU, to operate as would a standard credit card containing a magnetic strip or a "smart card" containing integrated circuitry. This is a desirable way of obtaining consumer information, such as birth date, driver's license number, social security number, or the consumer's name. Indeed, when dealing with driver's licenses, optical analysis of the license may be the only reasonable way to automate information procurement, as not all states' licenses contain magnetic strips, and the magnetic data on the various states' licenses are encoded in differing formats.

With this in mind, a focus of the disclosed system has been to provide an optical analysis algorithm capable of recognizing and analyzing the textual printing on the face of the driver's licenses of all fifty states. Of course, the system is not so limited, and could be configured to recognize other textual forms of consumer identification. An analysis of driver's license is disclosed merely as a preferred embodiment.

A. Background

Textual data are often arranged in forms. The consistent, regular organization of a form or report makes it easy to obtain desired information very quickly. For example, the organization of a phone book makes it easy to find a specific telephone number. Other examples of forms include paycheck stubs, business cards, telephone bills, stock reports, insurance cards, credit cards, passports, visas, and driver's licenses. It is the consistency of the organization that makes the form useful.

It is often the case that a transaction involves or is conditioned upon an exchange of information between buyer and seller. One example has already been given. A liquor store clerk must verify the age of the consumer prior to a transaction. The consumer's driver's license (a form) provides the necessary information. A transaction for medical services provides another example. When a consumer receives services from a doctor, she shows her insurance card (a form) which provides the needed information to the doctor to bill the insurance company.

In many transactions that involve an information exchange involving a form, a human operator reads the information and either immediately acts upon it (by allowing the purchase of alcohol) or transfers the information from the customer's form (e.g., an insurance billing number) to a computer. This can be a laborious and error prone process. This function is normally performed by a human operator because humans can read forms and computers typically can not. There is therefore a need to enable computers with the ability to read forms, such as driver's licenses. This section describes methods believed to be novel for doing so. One skilled in the art will recognize that these methods are easily implementable on a computer, such as those provided in the disclosed system, and could be coded in any number of ways to perform the tasks described herein.

B. Template-Based Character Recognition

The preferred method for optically determining the textual information printed on the face of an ID card, such as a driver's license, employs the concept of template-based character recognition. According to this scheme, one starts with an unknown character or other image, such as a letter or a picture, and compares an optically scanned version of that character or image to a series of templates. The templates are compared to the scanned character or image to determine the extent of the "overlap" of each template. The template with the smallest degree of overlap, i.e., the one which "lines up" with the scanned image, is chosen as the template that matches, and therefore determines, the scanned image. Of course, because the template and the scanned image may be differently centered, the template may need to be slid (e.g., up and down, and from left to right) with respect to the scanned image to ensure that the degree of overlap is accurately assessed.

Template-based character recognition involves two tasks: the recognition task itself, which is discussed in this section, and the task of template creation, which is discussed in the next section. This disclosure improves upon both of these aspects of template-based character recognition, in ways that are discussed below.

With respect to the recognition task, assume that a scanned test image, such as a scanned driver's license, contains a two-dimensional array of M by N pixels, and that $D(i,j)$ represents the intensity of a particular pixel $(i,j)$, preferably a gray scale value ranging from 0 Hex to FF Hex (i.e., from 0 to 255). Assume further that there is an unknown character starting at coordinate $(r,s)$ in the test image that represents one of K possible characters represented by K templates. (The procedure for generating the templates will be disclosed later). These templates are denoted $T_k(i,j)$, wherein k=1, 2, . . . K. The vertical and horizontal dimensions of the $k^{th}$ template are denoted by $m_k$ and $n_k$ respectively.

Template matching involves comparing each of the K templates to the test image and choosing the template that is "closest" to the test image to determine the unknown character at (r,s). This is accomplished by calculating the least-squares "distance" between the test data D(i,j) and the templates $T_k$(i,j), which is a way of quantifying the extent of the overlap between the template and the unknown character. This distance $dist_k$(r,s), can be defined as:

$$dist_k(r, s) = \sum_{i=1}^{m_k} \sum_{j=1}^{n_k} (D(r+i, s+i) - T_k(i, j))^2 \qquad (eq.\ 1)$$

For convenience, it has been assumed that M>>$m_k$ and N>>$n_k$. This is a reasonable assumption because the unknown character is typically embedded in a large scanned image (e.g., several inches in both dimensions) while the size of the template is equal to the actual character size (about one tenth of an inch in both dimensions).

As noted, the metric provided by Equation 1 gives the distance between the template and the test image starting at coordinate (r,s). The template that provides the minimum distance in this equation is the "winner" and is chosen as the template that represents the character under analysis. If the character under analysis is the $k^{th}$ character, then $dist_k$(r,s)= 0; in other words, the character and the template match exactly, an ideal situation.

However, in practice, the test character as scanned will probably be corrupted by noise, sampling artifacts, or other distortion. Additionally, each of the pixels of the scanned characters will preferably be represented by a gray scale value, which may have poor contrast—i.e., the image may constitute just a few shades of gray. This will cause this distance metric to be non-zero for the matching template, but hopefully small, especially in comparison to the other K−1, non-matching (incorrect) templates. However, such discrepancies can lead to errors in the recognition process, and may cause the distance for a non-matching template to be smaller than the distance for the correct template, resulting in an error and incorrect recognition.

To relieve these problems, it has been discovered that it is desirable to vary equation 1 to reduce error that might be attributed to gray scale variations as follows:

$$dist_k(r, s) = \sum_{i=1}^{m_k} \sum_{j=1}^{n_k} (D(r+i, s+i) - [\alpha T_k(i, j) + \beta])^2$$

In this equation, fitting parameter $\alpha$ scales the intensity of the template while fitting parameter $\beta$ denotes a constant intensity bias. This approach is believed to be novel in that these parameters adjust the contrast of the template to match the contrast of the test data. Convenient expressions for fitting parameters $\alpha$ and $\beta$ which result in a minimal distance can be computed using ordinary calculus:

$$\alpha = \frac{m_k n_k A - BC}{\Delta}$$

$$\beta = \frac{\Omega C - AB}{\Delta}$$

where

-continued $$A = \sum_{i=1}^{m_k} \sum_{j=1}^{n_k} D(r+i, s+j) T_k(i, j)$$

$$B = \sum_{i=1}^{m_k} \sum_{j=1}^{n_k} T_k(i, j)$$

$$C = \sum_{i=1}^{m_k} \sum_{j=1}^{n_k} D(r+i, s+j)$$

$$\Omega = \sum_{i=1}^{m_k} \sum_{j=1}^{n_k} T_k^2(i, j)$$

$$\Pi = \sum_{i=1}^{m_k} \sum_{j=1}^{n_k} D^2(r+i, s+j)$$

$$\Delta = m_k n_k \Omega - B^2$$

Therefore, the minimum distance corresponding to the optimum $\alpha$ and $\beta$ is $$dist_k(r,s|\alpha,\beta) = \Pi - \alpha A - \beta C \qquad (eq.2)$$

Significant advantages are achieved through the use of this modified distance metric. First, in comparison to a traditional least-squares formulation, the above formulation only requires one pass through the data to determine the optimal $\alpha$ and $\beta$ using the above equations, resulting is significant computational savings. By contrast, in a traditional least squares formulation, two passes would be required to determine the fitting parameters $\alpha$ and $\beta$. In the first pass, the average value of the image data D(i,j) would be calculated. In the second pass, the variance of that data would be calculated. Because the variance calculation depends upon the average value, these two calculations must be done in sequence, and cannot be done simultaneously in one pass.

Second, because this formulation, via fitting parameters $\alpha$ and $\beta$, adjusts the intensity levels of the template to match the test image, the intensity of a stored template is of no importance. In other words, the templates do not have to be stored with gray scale values, and can instead be more efficiently stored, such that every pixel in a template $T_k$(i,j) is denoted by either a logic '0' or a '1' (representing completely dark and light pixels). In other words, the templates can be stored as black and white images, without the need for storing gray scale values, typically eight bits per pixel (i.e., from 0 Hex to FF Hex). Additionally, "quantization" of the templates results in significant computational advantages because it turns many of the necessary multiplication steps into logical operations that are more efficient. Consider for example the calculation of parameter "A" above, which represents the sum of products of D(r+i,s+j) and T(i,j). Although the values for D(r+i,s+j) represent grayscale values, e.g., from 0 to 255, T(i,j) represent either ones or zeros. Therefore, "A" is really just the sum of all D(r+i,s+j) when T(i,j) is equal to one. No multiplies are required, except in the calculation of "Π." (Note that parameters "B" and "Ω" depend only on the template, $T_k$(i,j), and are computed in advance and stored in the template data structure for use during recognition). Some loss of accuracy results from this template "quantization" step. However, for images sampled at 400 dots-per-inch (dpi), this loss of accuracy should not lead to an intolerable error rate.

As mentioned earlier, the procedure for matching a template in the vicinity of the test character at coordinate (r,s) is to "slide" the templates horizontally and vertically with respect to the test image until a best fit is found, preferably pixel by pixel although other prescribed offsets could also be used such as every other pixel. At each offset for a given template, the fitting parameters α and β are calculated according to the formulas given above, and the distance is calculated for each offset. This yields several distance calculations for each template, corresponding to each slide of the template, and the smallest of these distances is kept as the minimum distance for each template. Each of the minimum distances for each template are then compared to determine the template with the smallest minimum distance, such template being determined as the matching template which determines the character at (r,s).

For larger templates, the template matching algorithms can become computationally demanding and a less computationally-demanding algorithm may be required. For this purpose, a modified distance metric can be used which only compares a subset of the pixels $T_k(i,j)$ in the template with the pixels $D(i,j)$ in the test image. This modified distance metric is represented as $$dist_k(r, s \mid \alpha, \beta) = \sum_{p=1}^{P} (D(r + i_p, s + j_p) - [\alpha T_k(i_p, j_p) + \beta])^2$$

This reduces any given distance measurement down to an assessment of P terms. The set of points $(i_p, j_p)$ at which the distance is calculated is determined in advance and is optimized for best performance. This procedure is called "fast" template matching and is preferably only used for large templates. These "fast" templates can be stored more efficiently than the full test image.

C. Template Training

To be able to optically "read" pertinent information on, for example, a driver's license, it has been discovered that it is beneficial to allow the system to "learn" the template corresponding to a driver's license of a particular state, rather than "feeding" the template into the computer in the first instance. This procedure can increase the accuracy with which optical recognition of characters on the license is determined when compared with pre-fed templates, which may or may not accurately reflect the true structure of the "form," and which may not be able to handle variations in the elements on the license. However, while this training approach is believed novel, template training is not specifically necessary to the implementation of the disclosed invention, and pre-fed templates (i.e., templates generated off-line and in advance of recognition) may work adequately.

Template training involves using example characters to generate a character template $T(i,j)$. Throughout the training process, it is assumed that a set of scanned forms is available. For example, if the problem presented is character recognition for a Texas driver's license, then we will assume that several, e.g., 30, different Texas driver's licenses have been scanned into the computer. This driver's license image data will be used during the training process. During template training, the driver's license data will be used to obtain examples of each character. For example, if we wanted to create a template for the character "5," we would look through the inventory of 30 scanned Texas drivers licenses and extract all the examples of the character "5" to form the template. Note that an operator must review the scanned license to isolate those portions of the larger image that contain the image for the number "5" in order to provide the examples necessary to "train" the "5" template. This is a time consuming process which can be automated somewhat by a computer or workstation.

As the generation of only a single template is referred to, the index ("k") has been dropped from the notation. Let $A_1(i,j), A_2(i,j), \ldots A_N(i,j)$ represent examples of a particular character isolated from the set of sample licenses. The template $T(i,j)$ will preferably recognize all of the given examples as if they were actually embedded in a test image. Therefore, the template is chosen to minimize the distance between the template and each of the examples. Due to uncertainty in the sampling phase and other anomalies, the examples must be shifted until they are all aligned. The total error or distance between the template and the examples is expressly mathematically as $$\sum_{k=1}^{N} \sum_{i=1}^{m_k} \sum_{j=1}^{n_k} (T(i, j) - A_k(r_k + i, s_k + j))^2$$

The offsets $(r_k, s_k)$ are adjusted until a minimum of the total error is reached. At the minimum, the template is given by the average of all the examples, which is expressed mathematically as $$T(i, j) = \frac{1}{N} \sum_{k=1}^{N} A_k(r_k + i, s_k + j)$$

This formula can be updated recursively as new examples are found. Thus, suppose $A_N(i,j)$ represents a new example. When this new example is shifted until a best fit (i.e., minimum distance) is achieved, a new offset $(r_N, s_N)$ is provided. The template formula can then be updated as follows:

$$T(i, j) = \frac{N-1}{N} T(i, j) + \frac{1}{N} A_N(r_N + i, s_N + j)$$

D. Sequence Estimation

Information in a form is typically represented by more than just a single character. The information of interest may be a date, a number or amount, a word, a name, etc. These types of information are represented by a sequence of characters. A sequence estimation algorithm uses the character recognition algorithm of the previous sections to recognize the individual characters of a word, number, or other string of characters. The sequence estimation algorithm must also be able to detect the end of a variable length string of characters.

Sequence estimation takes as its input a pattern specification. The pattern specification defines specific characters, or more generally types of characters, that are present in a string of characters. Various different characters include numbers, capital letters, lower-case letters, punctuation, delimiters, and symbols. Character types include "wild cards" (designating any particular character), letter type (whether upper or lower case), and alphanumeric type (any letter or number). Character types may also include other symbols, for example, the seal appearing on a driver's license. A pattern specification also contains information on the minimum and maximum number of characters that can occur within a particular test image.

Take for example the birth date on a Texas driver's license, which takes the following format: MM-DD-YY, where MM represents the month, DD represents the day, and YY represents a year, and where each of these designator is separated by a dash "-". In this format, both the month and the day may be either one or two characters in length (compare 9-1-75 with 11-12-75). Thus, a pattern specification for the date would look like $$N[1:2] \text{ "-" } N[1:2] \text{ "-" } N[2:2]$$

The "N" denotes that the particular field contains numbers, and [1:2] denotes a sequence with either one or two characters. Together, N[1:2] denotes that the computer should look for a variable length sequence of numbers of either one or two characters in length (the month). Continuing through the pattern specification, the computer next looks for one dash character "-", followed by another variable length sequence of numbers of either one or two characters in length (the day), followed by yet another dash. Finally, the computer looks for the last sequence, which necessarily constitutes a two-character numerical sequence (the year). This exemplary pattern specification consists of five elements, referred to as pattern characters, although two of these pattern characters (N[1:2] and "d") are repeated for this particular pattern specification.

Consider as another example the consumer's name as printed on the face of Texas driver's license, and assume that the name is written in all capital letters with the first name first and the last name last. A suitable pattern specification should be able to describe the name "ALEXANDER PEABODY" as well as "JON DOE," even though these names are different in length. Such a pattern specification might look like $$A[1:64] \text{ " " } A[1:64]$$

Here, the "A" designates a capital letter. So, this pattern tells the computer to look for between one and sixty-four capital letters in the first name, followed by a space, followed by between one and sixty-four capital letters in the last name. Again, this pattern specification consists of three pattern characters.

If lower case letters were used then the letter "a" could be used to designate the lower case alphabetic character type. Thus, if a name were printed using capital letters for only the first letter of each name, and if the last name were printed first and separated from the first name by a comma and a space (e.g., "Lewis, Terril"), a suitable pattern specification might look like $$A[1:1] \, a[1:63] \text{ "," "0 " " } A[1:1] a[1:63]$$

As noted earlier, the sequence estimation algorithm uses the pattern specification to determine what sets of templates to use when performing character recognition. Therefore, in the last given example above, sequence estimation will utilize 54 different templates to assess the consumer's name: 26 Texas license "capital letter" templates, 26 Texas license "lower case letter" templates, and Texas license templates designating the comma and space. For this example, the pattern specification contains four pattern characters.

There are two methods for sequence estimation: maximum likelihood sequence estimation (MLSE) and symbol by symbol detection. MLSE essentially builds a tree of all possible patterns allowed by the pattern specification. Every combined pattern is tried and the best matching pattern is the winner. Performing this comprehensive search is time consuming but can be efficiently implemented in a given application if necessary.

As an example of MLSE, suppose the computer is provided a pattern specification "N[2:3]," denoting the analysis of a sequence of numbers that is either two or three numbers long. There are 1100 different sequences that fit this specification: 00, 01, . . . , 09, 10, 11, . . . , 19, . . . , 99 (i.e., 100 two-number sequences), and 000, 001, . . . , 009, 010, 011, . . . , 019, . . . , 099, 100, 101, . . . , 999 (i.e., 1000 three-number sequences). In MLSE, the computer would concatenate together the image templates for each of these 1100 sequences, would compare each of these concatenated templates with the single test images of the characters under analysis, and would choose the one with the best match using the template matching algorithm disclosed above. In each case, the whole sequence of characters is compared as if it were one image as opposed to comparison of the individual characters.

While not as comprehensive, symbol by symbol detection generally performs as well as does MLSE when the distortion in the given image is low, which is usually the case in form processing, and therefore is the preferred approach employed by the OSU. In symbol by symbol detection, character recognition proceeds in a linear sequential fashion through the character string under analysis. Consider again the pattern specification of N[2:3]. Employing symbol by symbol detection, the computer would look at the specification and would see that the first character must be a number. The computer would perform template matching, as disclosed above, using the templates for the characters 0 through 9, and choose the best match. Suppose that the best matching template for the first character was "5". The computer would then again consult the specification and see that the next character must also be a number. It would therefore again perform template matching and choose the best match. Suppose that the best matching template for the second character was "4," so that, thus far, the sequence "54" has been recognized. Next the computer would look at the specification and see that the next character may be a number, but may also be a space (" ") because the specification indicates that the sequence may be either two or three numbers in length. Accordingly, when performing pattern matching, the computer consults the templates for 0 through 9, and additionally consults a space template (which would be a blank template). Suppose that the best matching character was " ". Then the computer ultimately determine that the sequence under analysis was "54". Suppose, on the other hand, that the best matching character was "3". Then the computer would ultimately determine that the sequence under analysis was "543."

Representing a particular element pursuant to a pattern specification is beneficial in that it reduces the number of character (or symbol) template comparisons that need to be used in the analysis of a given element. Take, for example, the "lastname, firstname" pattern specification of A[1:1] a[1:63] "," " " A[1:1] a[1:63] discussed earlier. As noted, this pattern specification requires the use of 54 templates to perform an analysis of the alphabetical string "lastname, firstname". Were a pattern specification not used to assist in the analysis, each character in the name under analysis would potentially need to be compared against each of the 54 templates. For even a short name, like "Li, Tan", consisting of five letters, a space, and a comma, this exercise could involve 54*7 template comparisons, which could be very computationally demanding and slow. By providing the algorithm, through the pattern specification, information concerning the expected characters in the element, the number of comparisons is greatly reduced. For example, determination of the first letter in the name requires comparison to only 26 templates, i.e., the upper case templates, and the sequence estimation algorithm may ignore the lower case letter templates, the space template, and the dash template. By the time the analysis is completed for this example, the number of comparisons is approximately cut in half. This results because the pattern specification references only a particular subset of templates to be used at certain points in the analysis.

E. Form Decomposition

Although the disclosed character recognition techniques may be used with a variety of forms, a driver's license is used as the example form in the following discussion due to its utility in the disclosed Davis system.

Figure 8:
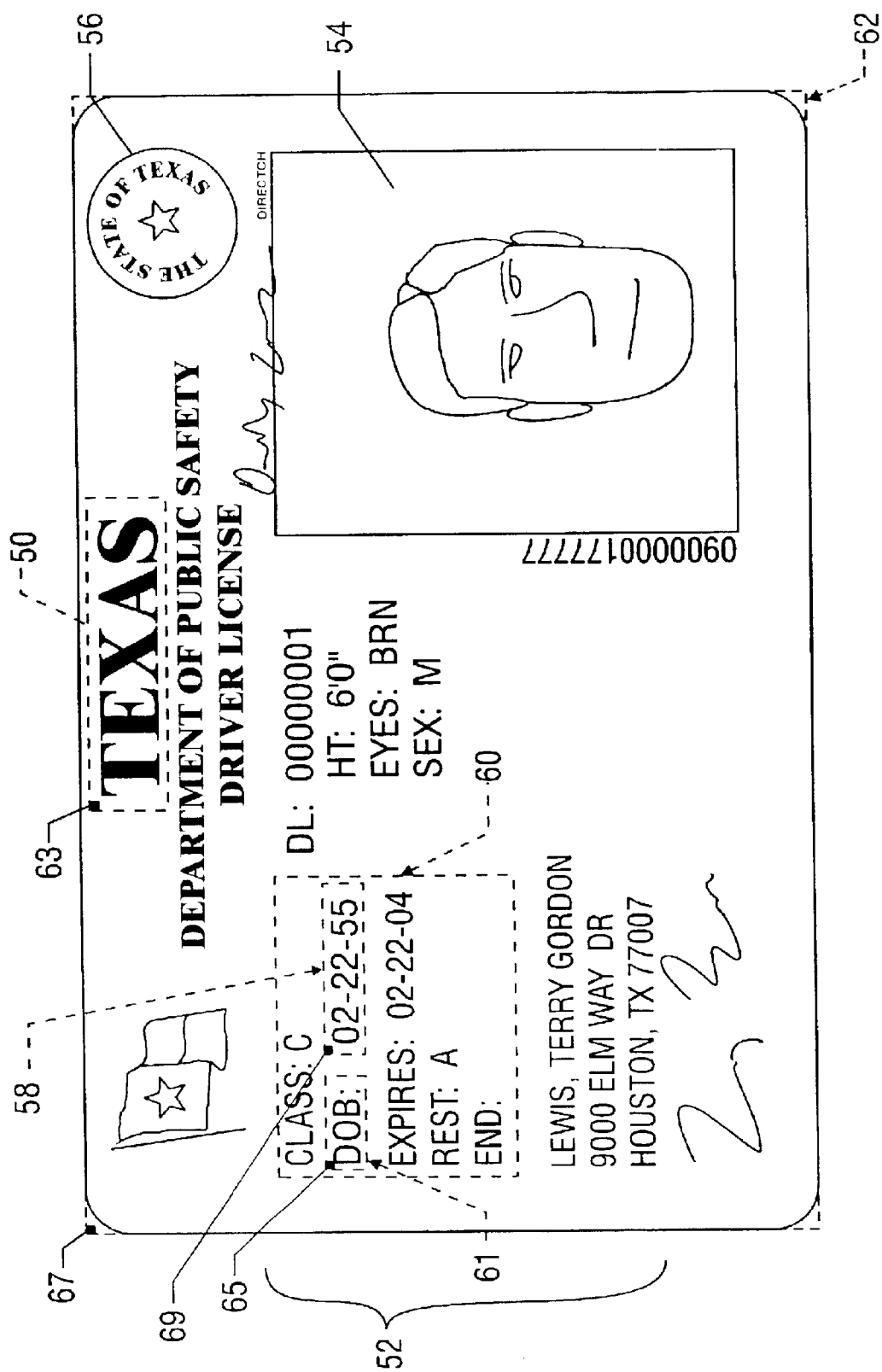
FIG. 8 shows an exemplary driver's license capable of being optically analyzed by the system.

As shown in FIG. 8, a driver's license contains many different pieces of information, including: the license (form) header 50, which identifies the state in which the license was issued (e.g., "Texas"), (2) data 52, such as the holder's name, address, date of birth, driver's license number, and expiration date, (3) a holder ID photo 54, and (4) a validation seal 56, used to verify the genuineness of the license. For a particular state, the information is arranged on the card at various known locations. The date of birth, for example, is always located in the same general vicinity on a Texas driver's license.

To process the driver's license, the license is decomposed into three hierarchical levels, called "form," "cluster," and "element." An element 58 denotes a single piece of information, such as the date of birth. A cluster 60 denotes a group of elements, or possibly a single element, that occur near each other on the license. For example, the license class, the date of birth (DOB), the expiration date, license restrictions (REST), and "END", may all represent elements 58 within a single cluster 60. A form 62 denotes a group of clusters, and typically represents the entire image under analysis.

The form and each cluster typically have "headers" with which they are associated. For example, form header 50 on the Texas driver's license reads as "TEXAS." Several pieces of graphical information within cluster 60 could operate as cluster header 61, such as "CLASS:", "DOB:," or even possibly the graphic of the Texas flag above these elements, were this graphic to be contained within cluster 60. For simplicity, and unless otherwise noted, it will be assumed that "DOB:" operates as the cluster header 61 for the cluster 60 illustrated in FIG. 8.

The form header and the cluster headers contain, respectively, a form header origin and cluster header origins. The form header origin 63 and the cluster header origins (e.g., 65) are represented, respectively and preferably, by the upper-left-most pixel in the form header and the given cluster header. The form header origin is determined with reference to the upper-left most pixel in the entire scanned image, which is referred to for convenience as the image origin 67.Thus, if the image origin has horizontal and vertical coordinates of (0,0), and if, for example, the entire image is 1000 pixels in the horizontal direction and 768 pixels in the vertical direction, the form header origin 63 for the form header 50 in the exemplary Texas driver's license shown in FIG. 8 might be approximately (400,20).

The cluster header origins are determined with respect to form header origin. In this respect, once the form header origin is known, that origin operates as the "master" origin from which the clusters are located. Relating the cluster header origins to the form header origin, as opposed to the image origin, assists in the subsequent optical analysis of the clusters in the event that the printing on the license has been uniformly shifted in a given direction. Thus, if the form header origin 63 is "reset" to (0*,0*), the cluster header origin 65 for the "date of birth" cluster might be at approximately (−350*,180*) with respect thereto, or approximately (50,200) with respect to the image origin. Of course, in a given application, the image origin can be used as the reference point for location of both the form header origin and the cluster header origins.

The location of each element, as defined by element origin 69, can be known with reasonable precision within a given cluster, and is determined with reference to the cluster header origin. An analysis of driver's licenses shows that there is a high variability (plus or minus 15 pixels) in the position of clusters relative to the form header origin but very small variability (plus or minus 1 pixel) in the position of elements relative to its cluster header origin. This provides the motivation for decomposing the form as described above.

F. Template Training in Practice And Exemplary File Structures

Figure 9A:
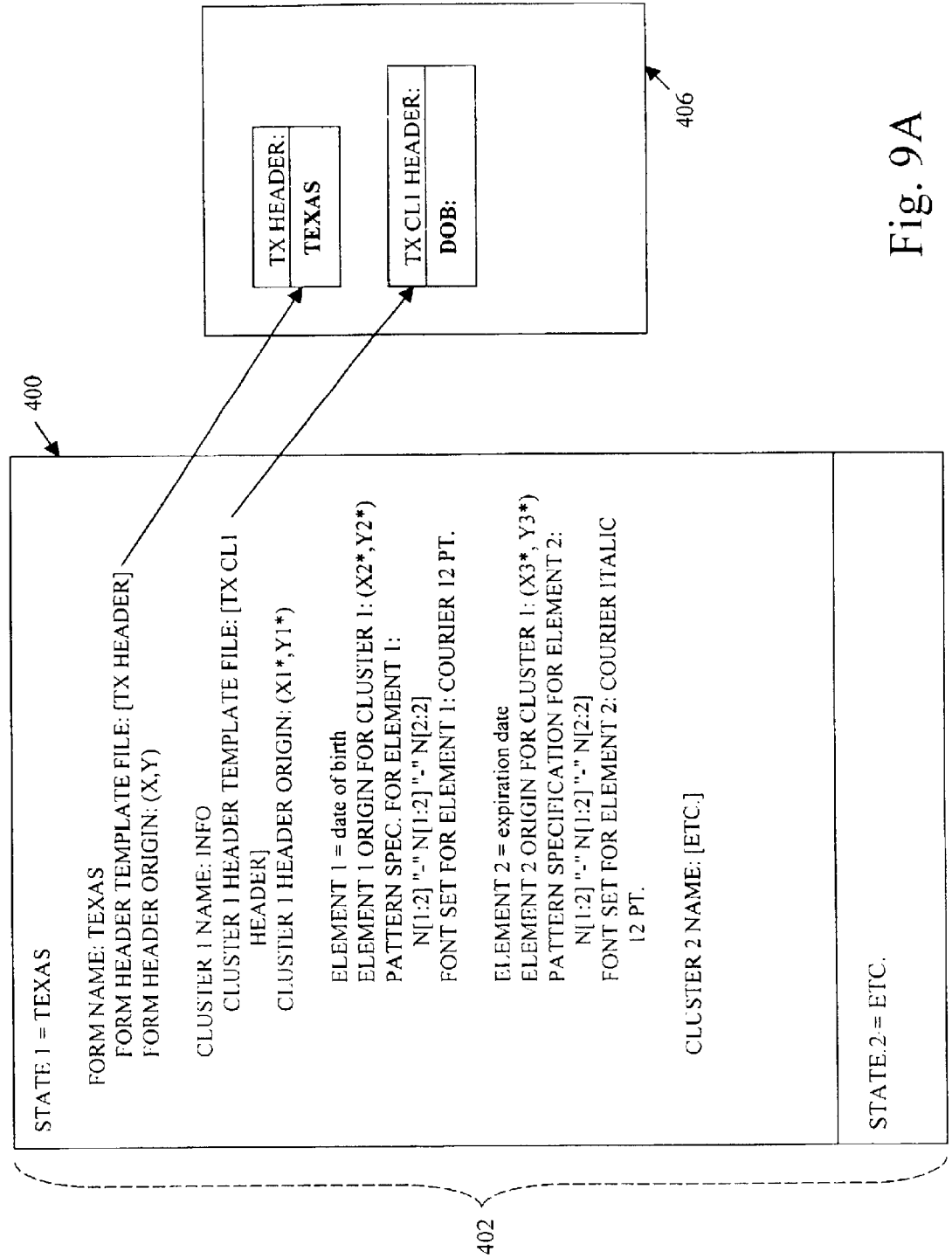
FIG. 9A shows an exemplary form and cluster information file structure used during optical character recognition (OCR).
Figure 9B:
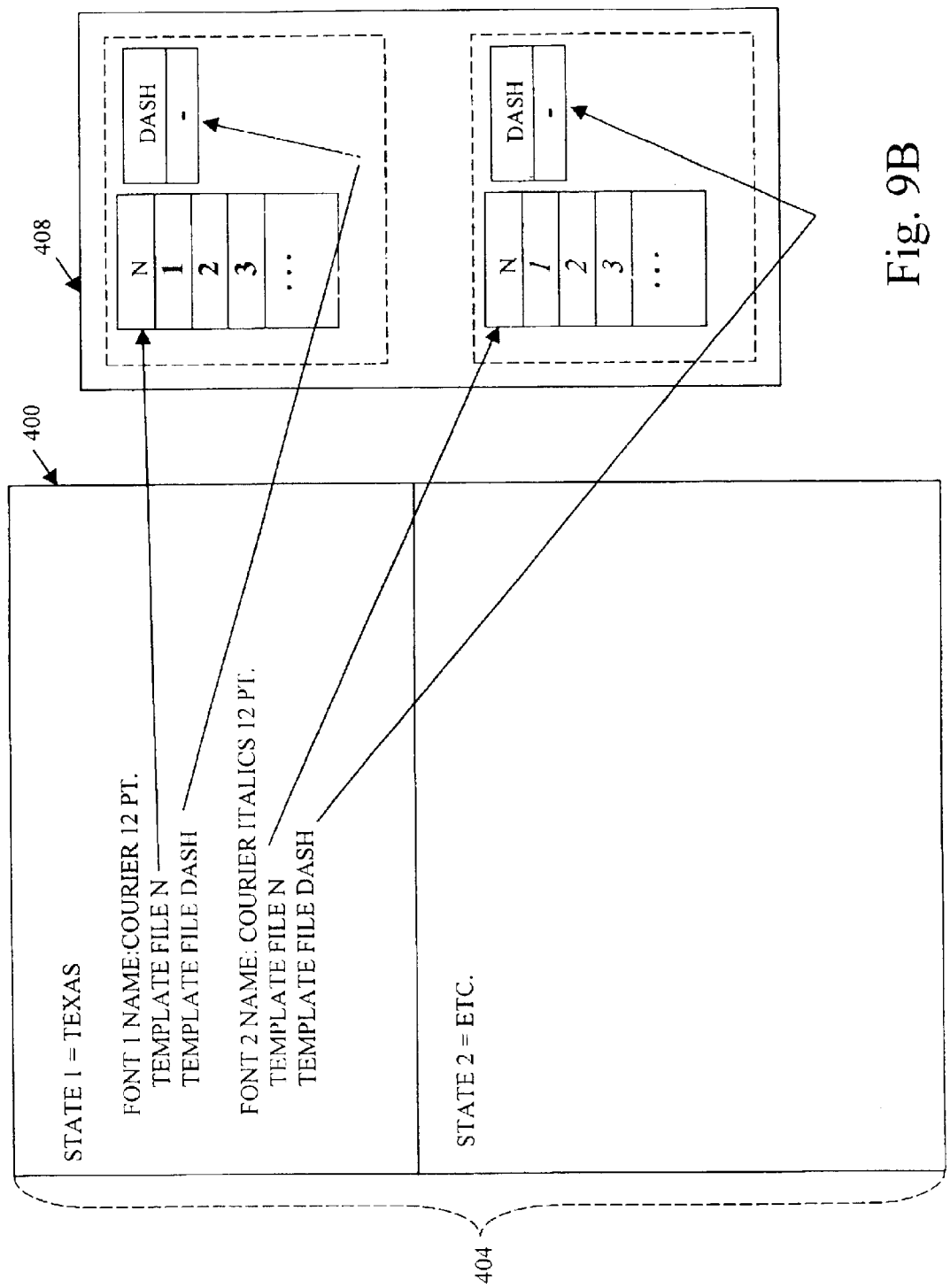
FIG. 9B shows an exemplary font information file structure used during optical character recognition (OCR).
Figure 10:
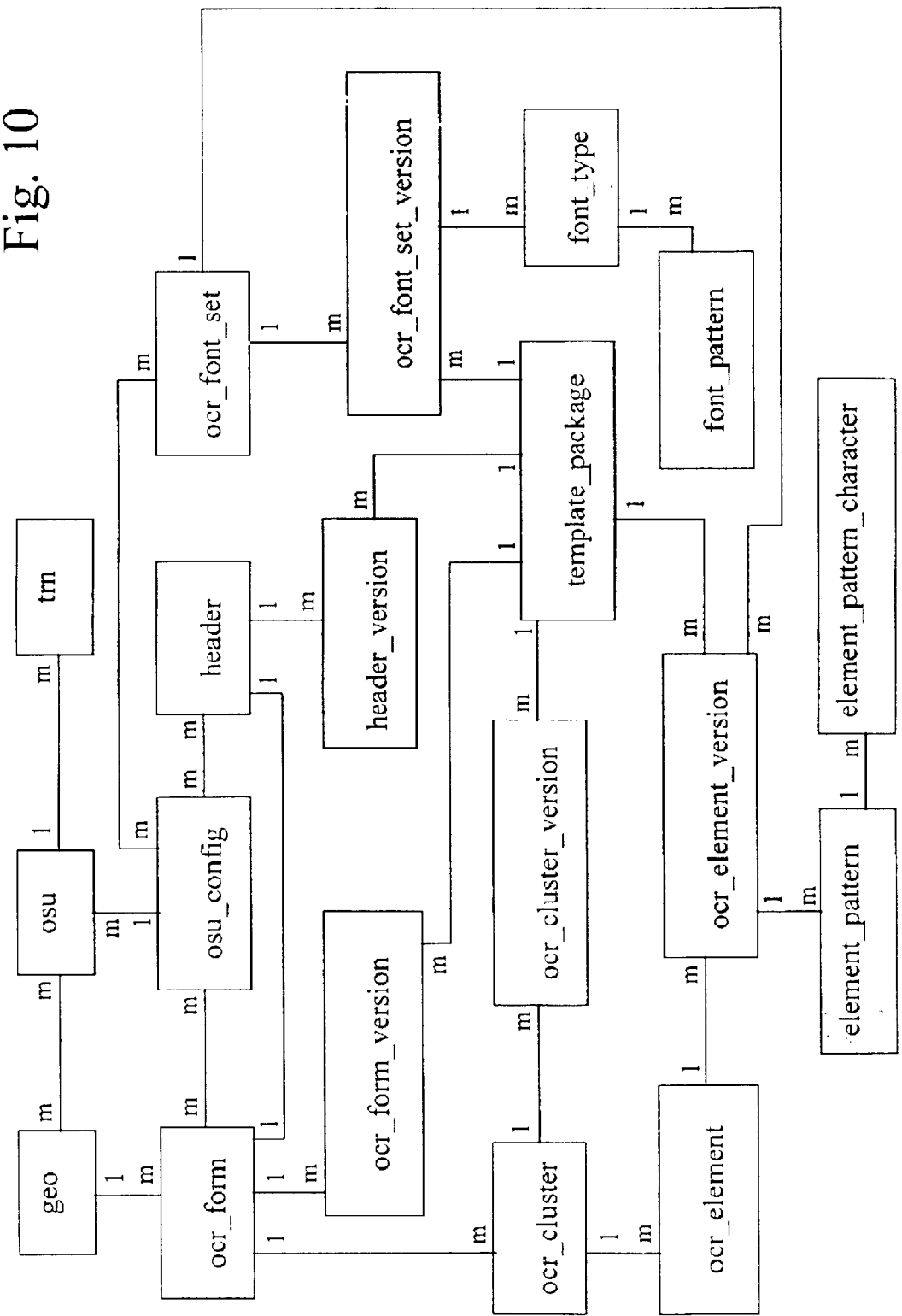
FIG. 10 shows the internal structure of the Davis system server cluster 18 and the relationships between the various data structures therein.

FIGS. 9A and 9B show a simplified illustration of the organization of the various computer files or data structures that are used by the disclosed OCR algorithms and a description of their contents. One skilled in the art will recognize that the files necessary for OCR as disclosed herein could be organized and structured in numerous ways. Indeed, FIG. 10 represents a broader disclosure of the organization of the data structures as they are preferably applied in a commercial system. FIGS. 9A and 9B are thus merely illustrative to describe possible relations between the various data structures referred to in the foregoing paragraphs in this section.

Referring to FIGS. 9A and 9B, a file, called information file 400, contains the 12 basic structure for the analysis of a particular drivers license form. File 400 is in this embodiment split into two sections that comprises the form and cluster information files 40 (see FIG. 9A) and the font information files 404 (see FIG. 9B) for a particular license. In a preferred embodiment, each state would have entries in both of files 402 and 404, although only the state of Texas is shown as an example. Generally speaking, form and cluster information file 402 contains information used in processing a particular form, such as the form name, the name of the file containing the form header template, and the form header origin. Form information file 402 also contains information concerning the various clusters of interest in the form, such as the cluster name, the names of the file containing the cluster header template, the cluster header origin, the element origin for each element in the cluster, the pattern specification for each element, and the font associated with each element. Optionally, file 402 may also contain information such as the sizes of the form header and the cluster header specified relative to the form header origin and the cluster header origin respectively. For example, if it is known that the form header is 300 pixels in the horizontal direction and 80 pixels in the vertical direction relative to the form header origin, these offset may also be specified in file 402, and may be of assistance in further defining the location of the form header in the image under analysis.

Generally speaking, font information file 404 contains all of the necessary font information for a particular form. What fonts are required for a particular form is determined by the pattern specifications specified in the corresponding form and cluster information file 402. Thus, in the simple example shown in FIGS. 9A and 9B, which contains the file structures necessary for determining the date of birth and expiration date on a Texas driver's license, the font information file 404 contains information concerning the fonts necessary to implement the pattern specification for these elements. In this case, the same pattern specification, N[1:2] "-" N[1:2] "-" N[2:2], is used to decipher both the date of birth and the expiration date because both of these elements on a Texas driver's license have the same format. However, for exemplary purposes, assume the date of birth is written in courier 12 point font, while the expiration date is written in courier italic 12 point font. Both of these font types are specified for each element, as shown in FIG. 9A.

As noted, both the form and cluster information file 402 and the font information file 404 specify and reference certain template file names, which are respectively referred to as form and cluster templates files 406 and character templates files 408. Form and cluster template files 406 contain the form header template and the cluster header templates for a given state. Thus, and for example, the Texas form and cluster template files in FIG. 9 include the form header template (e.g., "Texas"), which as previously noted is the first template that will be considered when determining the state corresponding to the license under analysis. Also included are the cluster header template files. In this example, "DOB:" is used as the cluster header, although other headers within this cluster could be used as well, such as "CLASS:" or even a graphic such as the picture of the Texas flag (see FIG. 8). Of course, and depending on the information desired from the license, other headers may exist for a particular license form.

Font templates files 408 include all of the necessary character templates referenced by the pattern specification during sequence estimation. Thus, for the date of birth pattern specification, which references Font 1, a total of eleven templates are used, each written in Courier 12 point font as specified. Thus, ten of these templates correspond to font name N, which constitutes (preferably learned) templates for the numbers 0, 1, 2, . . . 9 as they appear in the date of birth field on a Texas drivers license. Together these 10 templates constitute a character template family. The eleventh template corresponds to font name dash (-), and is the template for the dash that separates the month, day, and year. Because, as assumed, the expiration date is written in Courier italic 12 point font, referencing Font 2, a different set of eleven templates are referenced, and which correspond to italicized versions of the eleven templates referenced with respect to the analysis of date of birth.

Of course, other fonts and character templates may be required for a given application. Additionally, and as mentioned earlier, letter fonts may be required for word or name analysis, such as capital letters and lower case letters, and which are designated respectively by "A" and "a" in the pattern specification. In this case, the font template file 408 would additionally contain 52 template files, corresponding to the 26 capital and lower case letters, for both the italics and non-italic Courier fonts. Further, each license form will probably require its own unique font templates, as it is unlikely that the fonts used between two different state's licenses will be suitably similar for analysis purposes, although this is possible.

Of course, an operative embodiment need not structure the files in the exact manner specified in FIGS. 9A and 9B. For example, the form header origin, or the size of the form header template, could be stored in file 404 instead of in 402. Furthermore, the form and cluster information file 402 could be hierarchically split into two separate form header and cluster files. Other variations are possible, as one skilled in the art will immediately recognize.

A suitable file structure such as that shown in FIGS. 9A and 9B must be set up in advance of analyzing a particular license. This preferably requires template training and other manual and computer-assisted analysis of the example licenses. Thus, the form header 50 and cluster headers 61 are preferably trained as discussed above, and their origins 63 and 65 (and, if necessary, sizes) determined. Element origins with a particular cluster must also be determined. Additionally, the font templates for the elements are preferably trained, again as discussed above. Finally, the pattern specification is determined. Such training is preferably formed on each state's license to be analyzed, again using preferably at least a minimum of thirty exemplary licenses. With such information pulled from the exemplary driver's licenses, files may then be structured and linked as shown in FIG. 9, (or more preferably, as in FIG. 10), and analysis of a license may now begin.

G. Form Processing

Form processing begins by taking a test image of the form under analysis, preferably by scanning with the OSU 6, wherein each pixel of the test image is associated with a black-and-white (grayscale) intensity (i.e., $D(i,j)$). (Color information could also be stored, but is not expected to be necessary for the analysis of driver's licenses. If color information is desired, the lamps 218 in the OSU 6 would preferably be modified to illuminate the license in red, blue, and green light, as one skilled in the art would recognize.) This image is preferably initially stored in the SRAM memory 234 on the OSU 6, and processed locally using the necessary template information stored in Flash 232.

The first step in the analysis is to determine the state of the license at issue. In this regard, each state's header template file is compared to the relevant pixels on the test images, using the stored form header origin to determine the suspected location of the header. Therefore, when attempting to match the Texas header template, the form header origin (e.g., 400,20) specified in file 402 is located in the test image, and the characters present at that position on the image are template matched. Because the form headers (e.g., "Texas") are typically printed in a large type face on the license, the "fast" template matching technique disclosed earlier preferably used for identifying the license type. Additionally, if information about the size of the form header has been stored in the form and cluster information file 402 as well as the form header origin, a particular rectangular field of pixels on the test image may be extracted, which may quicken analysis and better define the pixels on the test image to be analyzed.

Once the license type is determined and a template is chosen (e.g., the Texas template), cluster processing begins on each cluster of interest. For example, if it is desired to extract only the date of birth from a Texas driver's license, which would be necessary in an application requiring age verification, then there is only one cluster 60 to process. In this example, the cluster header origin is read from file 402, which as noted earlier corresponds to a pixel offset ($x^*,y^*$) with respect to the form header origin. However, because the location of the cluster may vary by plus-or-minus 15 pixels, the cluster header template 61 is preferably "slid" horizontally and vertically within this variable range to locate and "set" the cluster origin 65 as a particular pixel on the test image. This sliding and setting process involves assessment of the minimal distance as discussed above.

The analysis would be more complicated, and perhaps more time consuming, for an assessment of clusters that did not contain a cluster header, which would be the case if, for example, it was desirable to determine the name of the consumer from the face of the license. In this case, the cluster template would still have a pre-determined cluster origin, but would lack information about content. In this case, sequence estimation would begin immediately at the location of the cluster origin. Otherwise, a black rectangle the size of one capital letter could be used as a dummy cluster header template to assist in determining the location of the cluster or the elements within it.

Once the cluster header origin (or more generally, the cluster origin) has been determined, sequence estimation is performed for each element in the cluster as described above. The first step is to apply the element origin provided in file 402 to determine the location of the elements and the pixels at which sequence estimation analysis should begin. As noted previously, because the locations of the elements are known very precisely relative to the cluster origin (usually plus or minus one pixel), sequence estimation preferably begins immediately at this point without the need for template shifting and distance determinations. However, these extra steps may be useful in a given application to further ensure the accuracy of the analysis. Thereafter, the pattern specification (e.g., N[1:2] "-" N[1:2] "-" N[2:2]) is retrieved from file 402. Each portion of the pattern specification is linked to a font name in file 404, which in turn specifies the requisite character template files in file 408. These character template files in file 408 may then be used during sequence estimation as discussed above to determine the textual content of the element under analysis, in this case, the date of birth. As mentioned earlier, the templates consulted by the sequence estimation algorithm are preferably binary templates, which provides for efficient use of memory in the system and which speeds up the analysis.

H. Form Validation

As noted above, the test image of the driver's license is an optical image of the license that has been converted to grayscale. However, it might be easy to tamper with the license, e.g., by changing the date of birth with a marker, to fool the system. Or, a completely false form might be generated, e.g., using a computer and a printer. For this reason, it is preferred that a commercial system employ further analysis measures to verify the validity of the form being analyzed.

Several different methods of validation are possible. For example, most states' driver's licenses use a seal or hologram somewhere on the face of the license that can also be detected and analyzed using character recognition techniques. (The hologram can be detected as it will cast a shadow upon optical illumination within the OSU). This is preferably performed by training a template to represent the seal or hologram. Recognition of the seal or holographic image after recognizing the date of birth provides the needed verification, and helps to ensure that the form under analysis is not wholly false. For identification forms having a bar code, templates of the bar codes could also be stored and optically compared with the bar code on the form to further verify form validity using the disclosed techniques, which might be simpler in some applications than actually reading and interpreting the bar code in the standard manners known in the prior art.

Additional validation measures can be accomplished by comparing OCR data with magnetic stripe data. In this case, the OSU would also be fitted with a magnetic head, as in OSU 6, and the system configured to compare the optical data and the magnetic data to compare the retrieved information to ensure that tampering has not occurred. Further security could be added by encrypting the magnetic data. Of course, such a scheme would not be possible if the license under analysis does not contain a magnetic stripe, which is the situation in some states. Additionally, validation could be compared through a comparison of optical data with the consumer's credit card data to compare, for example, the consumer's name.

In the future, other types of verification may be used with licenses that could provide higher levels of security, and which could be easily handled with the disclosed techniques. For example, in the future, images could be encoded in the license which are only visible using an infrared detector. Such a security measure would be difficult to forge. If the OSU were fitted with an infra-red light source and detector, validation of the license could be performed with great confidence that the license is authentic and has not been tampered with.

I. Handling of ID Cards not yet having a Template on the System

It would be expected in a commercial system that a consumer may try to enter an ID card for which a template has not yet been created and stored in the system. In this instance, it is presently preferred that the ID card be scanned by the system, saved, e.g., in database 70, and that the following message be displayed to the consumer:

"The ID card you have inserted is not currently supported by the Davis system at this time. However, if you return within X hours, our system administrators will try to ensure that your ID card will be useable in the system. Please wait a few seconds while we scan your ID card. Thank you for your patience. We look forwarding to approving your ID card within X hours."

During the X hour timeframe, the system administrator will ideally have time to assess the stored image and create a template for it recognizable by the system. Otherwise, the image itself could be used as a specialized template, with systems assistants during this time working off line to verify the information on the card with appropriate officials, and then storing the contents of the ID card in a specialized file in the system associated with that specialized template. Thereafter, when the consumer returns to the system, his ID card will be recognized, but not necessarily subjected to analysis using a pattern specification. Instead, the ID card would be template matched, and information for that specialized template would be pulled from the specialized file created for that ID card and verified accordingly.

IV. System Configuration

A. Arrangement of Data Structures in the Database

Periodically, it may be necessary to provide updates usable by the OSU devices 10 in the Davis system. For example, in a system placed in service on a nationwide scale, and capable of receiving several different driver's licenses, the system's templates may need to be periodically updated if a given state changes the structure of its license. Additionally, it may be possible to add new functionality to preexisting OSU devices 10. Thus, an OSU device initially structured as a vending machine could be updated to also act as a change machine, or may be modified to allow age verified vending. Likewise, the OSU devices 10 may have to report data to the system. Such data can take many forms and could constitute, for example, the sending of the image data taken from the license or provide information relevant to the servicing of the OSU device 10.

Figure 11:
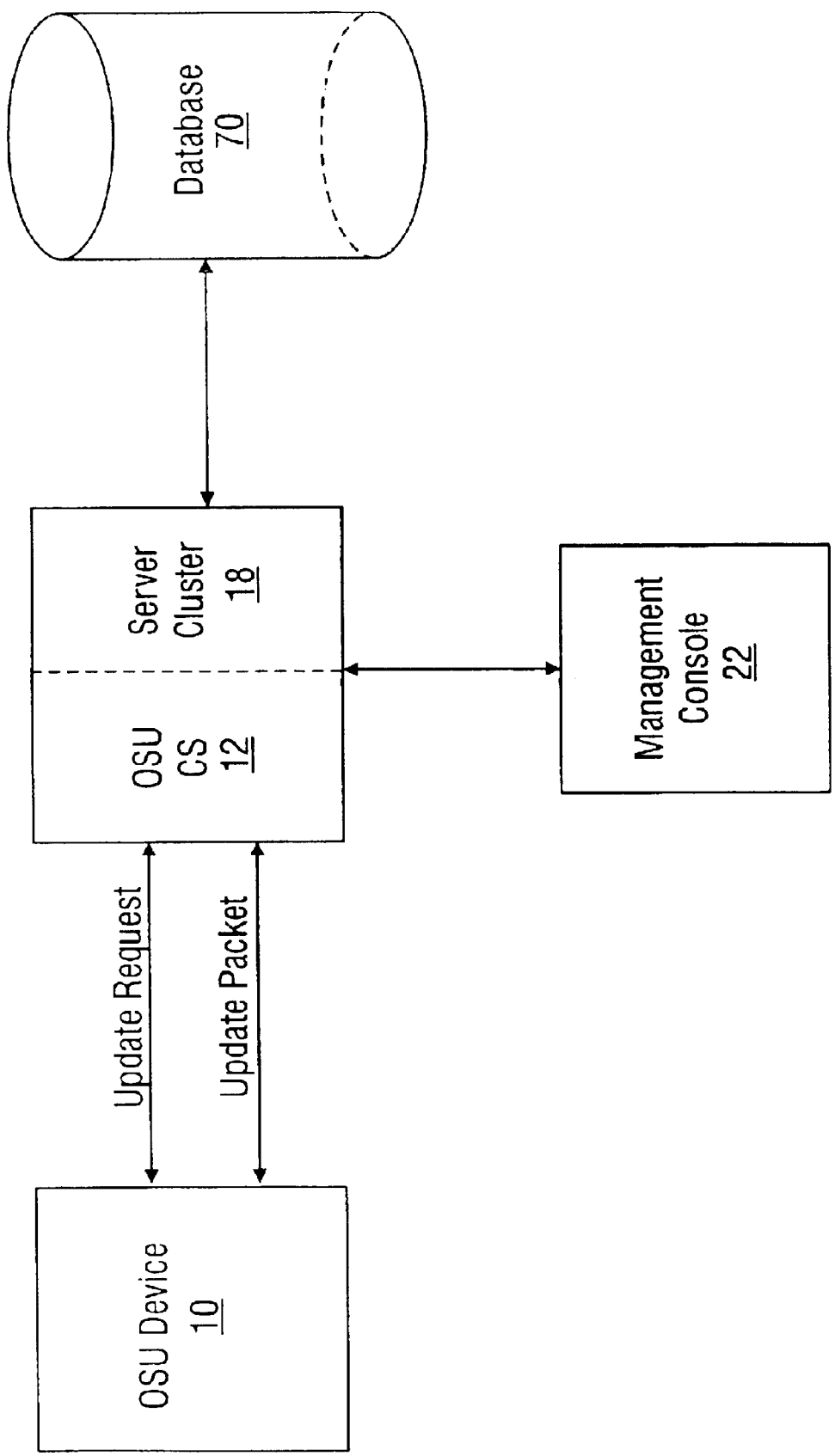
FIG. 11 shows a portion of the system disclosed in FIG. 1.

FIG. 11 shows a subset of the larger Davis system 8 and explains the way in which the central components in the system are managed. This figure shows an OSU device 10, the OSU connection server(s) 12 (OSU CS 12), the server cluster 18, and the management console 22. In this figure, the OSU CS 12 and the server cluster 18 are combined into one logical block in recognition of the similarity in function that these two components may provide. This combination in FIG. 11 notwithstanding, in a preferred embodiment, the OSU CSs 12 preferably merely act as communication points for the OSU devices 10, while the server cluster 18 stores important system data (such as consumer files and template files), performs necessary computations and interfaces with other non-OSU systems (such as user interface 20, FSS 14 or other integrated systems 24). Of course, one skilled in the art will recognize that these functions could be split between the servers 12 and 18 in any number of ways.

Important system data is preferably stored in database 70, including the configuration data for each OSU device 10 present on the system. The configuration of the various data components necessary to run the system and which are preferably stored in database 70 are shown in FIG. 10. FIG. 10 illustrates the various data tables and files (more generally, data structures) that are stored in the database, and shows their relationships in an "Entity Relationship Diagram" (ERD) format that is well known to those of skill in the art of database architectures. Pursuant to this format, the various tables within database 70 have relationships structured in a one-to-one (1—1) format, a one-to-many (1-m) format, or a many-to-many (m—m) format. Of course, the database could be structured in a variety of different ways to achieve suitable system performance as disclosed herein. Thus, FIG. 10 is merely exemplary of a commercial embodiment.

The contents of each table in FIG. 10 are described in the following paragraphs. It is important to note that the database structure supports more than one version of a template. For example, the state of Texas may have three different versions of its driver's license that have been issued and are active, and the system should be able to comprehend all three types. Accordingly, the system stores various versions of the templates and other supporting information relevant to the version, as shown in the disclosed "[Name]_version" tables below.

Consider, for example, tables "Header" and "Header_version" below. The "Header" table has only a few fields, including header name, description, and status. By contrast, the "Header_version" table contains a significant number of fields that apply to OCR analysis, including the form header templates that are used during OCR analysis. If an ID card authority like the State of Texas decides to issue a new license, a new form header version record is created and updated with the latest information. Such an organization scheme is similar to assigning a new model number to a product when just a few features in the product have been changed. In short, through this organizational scheme, a catalog of all versions of licenses issued in the State of Texas can be maintained and referenced in the database.

Geo: The "Geo" table stores information about the geographical locations of OSU device 10.

Geo

| Name | Type | Description |
| --- | --- | --- |
| Id | String | Unique identifier for every geo record |
| Name | String | Name of the geographical location |
| Note | String | Description of the geographical location |
| Creator_id | String | The user id that created this record |
| Editor_id | String | The user id that edited this record last |
| Created | String | The date it was created |
| Edited | String | The date it was last edited |
| Active | String | Flag representing if the record is active or not |

Osu: The "Osu" table represents information for a particular OSU device 10.

Osu

| Name | Type | Description |
| --- | --- | --- |
| Id | String | Unique identifier for every osu record |
| Osu_config_id | String | Osu config id that links this osu record to its configuration record in osu_config table |
| Serial_no | String | Osu unit serial number |
| Time_zone | String | Time zone for the osu unit |
| Line1 | String | Address line 1 for the osu unit |
| Line2 | String | Address line 2 for the osu unit |
| City | String | City in which osu is located |
| State | String | State in which osu is present |
| Zip | String | Zip code of the osu location |
| Directions | String | Directions if any to get to that osu unit |
| Cert | String | Certification of osu unit |
| Creator_id | String | The user id that created this record |
| Editor_id | String | The user id that edited this record last |
| Created | String | The date it was created |
| Edited | String | The date it was last edited |
| Active | String | Flag representing if the record is active or not |
| Acquirer_bin | Integer | Visa assigned Bank Identification number issued by the merchant's member bank or processor |
| Merchant_number | Integer | A unique number assigned by the signing merchant's bank or processor used to identify the merchant within the VisaNet system. |
| Store_number | Integer | Number assigned by the signing member, processor to identify a specific merchant store within the VisaNet system |
| Terminal_number | Integer | Number assigned to identify a unique terminal within a merchant location |
| Device_code | Character | Device type of the merchant submitting the authorization request |
| Industry_code | Character | Industry type of the merchant submitting the authorization request |
| Language | String | Language to be used in formatting the authorization response text message |
| Merchant_category | Character | Number assigned by the signing member or processor to identify a merchant industry classification |
| Merchant_name | String | Merchant Name |

Osu_config: This table contains configuration information for each OSU device 10. It has 1-m relation with "Osu" so that a single configuration can be applied to multiple OSU devices 10. "Osu_config" is linked with "Ocr_form," "Header" and "Ocr_font_set," and is related to each with a m—m relation. As will be explained later, each of these three tables is associated with a corresponding version table. At one time, only one version of each will be active for a particular configurable OSU device 10.

Osu_config

| Name | Type | Description |
| --- | --- | --- |
| Id | String | Unique identifier for every osu record |
| Name | String | Name of the osu configuration |
| Version | Integer | Version of the osu configuration |
| Creator_id | String | The user id that created this record |
| Editor_id | String | The user id that edited this record last |
| Created | String | The date it was created |
| Edited | String | The date it was last edited |
| Active | String | Flag representing if the record is active or not |

Header: This table contains information about the various form headers, and has a 1-m relation with "Header version" table.

Header

| Name | Type | Description |
| --- | --- | --- |
| Id | String | Unique identifier for every header record |
| Name | String | Name of the header |
| Description | String | Description of the header |
| Status | Integer | Status of header record to indicate if this header is the current (indicated by 0), added (indicated by 1) or removed (indicated by 2) one from the configuration |

Header_version: This table provides information for the headers, like their form header origin coordinates, and possibly their bottom right coordinates. It also stores multiple versions of the form header templates for the relevant states.

Header_version

| Name | Type | Description |
| --- | --- | --- |
| Id | String | Unique identifier for every header version record |
| Template_package_id | String | Template package record id that this header version is a part of |
| Header_id | String | Header record id which it is a version of |
| Version | Integer | Version number of this header version |
| Image_name | String | Image name used by this header version record |
| Top_left_id | String | Top left corner of the header region structure |
| Right_bottom_id | String | Right bottom corner of the header region structure |
| Creator_id | String | The user id that created this record |
| Editor_id | String | The user Id that edited this record last |
| Created | String | The date it was created |
| Edited | String | The date it was last edited |
| Header_template | Binary | Scanned image of the header version |
| Active | String | Flag representing if this version is active for its parent header |

Ocr_font_set: As mentioned previously, elements in a given form can be written using various fonts, such as Courier font, and these may be printed in different sizes. Basic font information for the elements is provided in the "Ocr_font_set" table. This table has 1-m relation with the "Ocr_font_set version" table.

Ocr_font_set

| Name | Type | Description |
| --- | --- | --- |
| Id | String | Unique identifier for every font set record |
| Name | String | Name of the Ocr Font Set |
| Description | String | Description if any, for the font set |
| Status | Integer | Status of font set record to indicate if this font set is the current (indicated by 0), added (indicated by 1) or removed (indicated by 2) one from the configuration |

Ocr_font_set_version: This table is dependent on "Ocr_font_set" and provides information for any "Ocr_font_set." The basic information for each of the fonts is stored within this table. Thus, "Family" represents the basic font type (e.g., Arial or Courier), "Font_size" represents the size of the font (e.g., 10 point or 12 point), and "Style" represents modifications of the font, such as italicized or bolded. It has 1-m relation with "Font_type" table.

Ocr_font_set_version

| Name | Type | Description |
| --- | --- | --- |
| Id | String | Unique identifier for every font set version record |
| Template_package_id | String | Template package record id that this font set version is a part of |
| Ocr_font_set_id | String | Font set record id which it is a version of |
| Version | Integer | Version number of this font set version |
| Family | String | Family of the font set (e.g., Arial or Courier) |
| Font_size | String | Size of the font set (e.g., 10 point or 12 point) |
| Style | String | Style of the font set (e.g., bold or italic) |
| Creator_id | String | The user id that created this record |
| Editor_id | String | The user id that edited this record Last |
| Created | String | The date it was created |
| Edited | String | The date it was last edited |
| Active | String | Flag representing if this version is active for its parent font set |

Font_type: This table stores the various types of characters recognizable by the system, such as "A" for upper case letters A–Z, "a" for lower case letters a–z, "N" for numbers 0-9, "P" for punctuation and symbols (such as .,'"-/;:!?( )[ ]{ }%$), "Z" for any upper or lower case letter, "X" for any letter or number, "*" for a wildcard representing any character, and "S" for a space. It has a 1-m relation with "Font_pattern" table.

Font_type

| Name | Type | Description |
| --- | --- | --- |
| Id | String | Unique identifier for every font type record |
| Ocr_font_set_version_id | String | Font set version record id which it is a type of |
| Font_type | String | Specifies the type of character stored in the associated font type (e.g., "A," "a," "N," "P," etc.) |
| Description | String | Description of the character that font type has |

Font_pattern: This table stores the character templates for a given font. For example, there would be twenty six templates stored within the "Font_pattern" table for each upper case letter and for each font type. Thus, assuming two fonts (e.g., arial or courier), there would be a total of 52 templates stored for each font type "A," representing upper case letters.

Font_pattern

| Name | Type | Description |
| --- | --- | --- |
| Id | String | Unique identifier for every font pattern record |
| Font_type_id | String | Font type record id which this pattern is a part of |
| Name | String | Name of the pattern |
| Font_data | Binary | Image of the font pattern |

Ocr_form: This table stores information for a form template. It is related to the "Ocr_cluster" table by a 1-m relation because a form template can have many clusters defined within it. It is associated with the "Header" table by a 1—1 relation that links the header belonging to a particular form. It is also related to the "Ocr_form_version" table. If any information is changed for an existing form template, a new version of it is created and a record is set for it in "Ocr_form_version" table.

Ocr_form

| Name | Type | Description |
|---|---|---|
| Id | String | Unique identifier for every form record |
| Geo_id | String | Link to the Geo table for associated state information for a form record |
| Header_id | String | Header id for the form header |
| Name | String | Name of the form (e.g., Texas driver's license) |
| Description | String | Description if any of the form |
| Status | Integer | Status of form record to indicate if this form template is the current (indicated by 0), added (indicated by 1) or removed (indicated by 2) one from the configuration |

Ocr_form_version: This table is dependent on the "Ocr_form" table and stores version information for each form. Included within this table is the X and Y coordinates for the starting position of the image under analysis. Thus, if it is known that the first ten pixels of a given form image contains information not indicative of the content of the form (e.g., because of the rounded corners that exist on the form), these first ten pixels can be ignored during OCR.

Ocr_form_version

| Name | Type | Description |
|---|---|---|
| Id | String | Unique identifier for every form version record |
| Template_package_id | String | Template package record id that this form version is a part of |
| Ocr_form_id | String | Form record id which it is a version of |
| Version | Integer | Version number of this form version |
| Xpos | Integer | X coordinate of the starting point of the form template |
| Ypos | Integer | Y coordinate of the starting point of the form template |
| Creator_id | String | The user id that created this record |
| Editor_id | String | The user id that edited this record last |
| Created | String | The date it was created |
| Edited | String | The date it was last edited |
| Active | String | Flag representing if this version is active for its parent ocr form |

Ocr_cluster: This table is dependent on "Ocr_form" table and provides a list of clusters for a particular form. It has 1-m relation with the "Ocr_cluster_version" table that provides versioning support. As discussed earlier, a cluster is a group of several elements. Therefore, "Ocr_cluster" is associated with the "Ocr_element" table to provide a list of necessary elements.

Ocr_cluster

| Name | Type | Description |
|---|---|---|
| Id | String | Unique identifier for every cluster record |
| Ocr_form_id | String | Form id which this cluster is a part of |
| Header_id | String | Header id for this cluster |
| Name | String | Name of the cluster |
| Description | String | Description of the cluster |

Ocr_cluster_version: "Ocr_cluster_version" stores the top left and right bottom coordinates for the cluster header origin and also stores the cluster header template images. Thus, for example, this table is where the cluster header image for the cluster containing the date of birth (such as "CLASS:", "DOB:", or the image of the Texas flag) would be stored.

Ocr_cluster_version

| Name | Type | Description |
|---|---|---|
| Id | String | Unique identifier for every cluster version record |
| Template_package_id | String | Template package record id that this cluster version is a part of |
| Ocr_cluster_id | String | cluster record id which it is a version of |
| Version | Integer | Version number of this cluster version |
| Name | String | Name of the cluster version |
| Point_id | String | Starting point (X, Y) for the cluster version template |
| Cluster_template | Binary | cluster image for this version |
| Creator_id | String | The user id that created this record |
| Editor_id | String | The user id that edited this record last |
| Created | String | The date it was created |
| Edited | String | The date it was last edited |
| Active | String | Flag representing if this version is active for its parent ocr cluster |

Ocr_element: This table stores the name and description of particular elements, such as date of birth, expiration date, name, etc. It also is related with "Ocr_element_version" table through a 1-m relation that provides versioning support.

Ocr_element

| Name | Type | Description |
|---|---|---|
| Id | String | Unique identifier for every element record |
| Ocr_cluster_id | String | Cluster id which this element is a part of |
| Name | String | Name of the element |
| Description | String | Description of the element |

Ocr_element_version: The "Ocr_element_version" in effect stores the element origins for the various elements within a cluster. Thus, this table stores top left and right bottom coordinates ("top_left_id" and "bottom_right_id") for sliding a character template during OCR analysis, and preferably defines a small rectangle at the upper left corner of the character under analysis. In this regard and as disclosed earlier, it has been noted that the location of an element within a cluster varies approximately plus-or-minus one pixel within the cluster. Therefore, and for example, a small rectangle, perhaps 3-by-3 pixels in dimension, is set at the element origin in the test image where it is expected that the first character in the element is located. In other words, the small rectangle defines the element origin in the test image as a variable region. The upper left pixel of the character template is then moved or slid to correspond to one of the nine pixels within the 3-by-3 pixel rectangle, and a distance metric is calculated for each position. The minimum of these nine distance metrics will define the location of the first character of the element under analysis. This procedure is then repeated as the sequence estimation algorithm sequentially identifies each character in an element.

Also referenced in this table are the various fonts and pattern specification that are to be used for the various elements during OCR analysis.

| | | Ocr_element_version |
|---|---|---|
| Name | Type | Description |
| Id | String | Unique identifier for every element version record |
| Template_package_id | String | Template package record id that this element version is a part of |
| Ocr_font_set_id | String | Font set record id for this element version record |
| Element_pattern_id | String | Element pattern id for this element version record |
| Ocr_element_id | String | Element record id which it is a version of |
| Version | Integer | Version number of this cluster version |
| Top_left_id | String | Top left corner of the element region structure |
| Right_bottom_id | String | Right Bottom corner of the element region structure |
| Creator_id | String | The user id that created this record |
| Editor_id | String | The user id that edited this record last |
| Created | String | The date it was created |
| Edited | String | The date it was last edited |
| Active | String | Flag representing if this version is active for its parent ocr element |

Element_pattern: The "Element_pattern" table is linked to "Element_pattern character" table with a 1-m relation and is linked to the "Ocr_element_version" table with a 1-m relation. The purposes of the "Element_pattern" and "Element_pattern_character" tables are to specify information about the pattern specification. For example, in the aforementioned pattern specification representing the six-digit date of birth (i.e., N[1:2] "-" N[1:2] "-" N[2:2]), there are five pattern characters in the pattern specification, three denoting the month, day, and year (N[1:2] and N[2;2]), and two denoting the dashes that separate them ("-"). Thus to create a database representation of a six-digit date of birth, one would create a record in the "Element_pattern" table with the name of "6-digit date" and then create pattern character entries in the "Element_pattern_character" table, each linking back to the newly created "Element_pattern" record.

| | | Element_pattern |
|---|---|---|
| Name | Type | Description |
| Id | String | Unique identifier for every element |
| Name | String | Description of pattern specification (e.g., "6-digit date," "social security number," etc.) |
| Creator_id | String | The user id that created this record |
| Editor_id | String | The user id that edited this record last |
| Created | String | The date it was created |
| Edited | String | The date it was last edited |
| Active | String | Flag representing if this pattern specification is active |

Element_pattern_character: The "Element_pattern_character" table stores information concerning each pattern character in the pattern specification. Thus, stored here are information for each pattern character's character type (e.g., "N" representing numbers, or the dash symbol) and length of the pattern character, represented by minimum and maximum number of occurrences of the character of that type (e.g., a minimum of 1 for the month, and a maximum of 2 for the month). "Seq" stands for sequence and denotes the order of the pattern characters within the pattern specification. Thus, "Seq" equals 1 for the first pattern character (i.e., N[1:2]), 2 for the second pattern character (i.e., "-"), and eventually would equal 5 for the last pattern character (i.e., N[2:2]).

| | | Element_pattern_character |
|---|---|---|
| Name | Type | Description |
| Id | String | Unique identifier for every element pattern character record |
| Seq | Integer | Identifies the place of a pattern character in it pattern specification. |
| Element_pattern_id | String | Element pattern id for this pattern character record |
| Character_type | String | Describe the type of character (e.g., "N" for numbers, "A" for upper case letter, etc.). |
| Min | Integer | Minimum character length of the element pattern character (e.g., 1 for month or day, or 2 for year). |
| Max | Integer | Maximum character length of the element pattern character (e.g., 2 for month, day, or year) |

Template_package: This table provides versioning support for all OSU configuration components. It stores the version number of latest configuration and also the lists for "Header_version," "Ocr_font_set_version," "Ocr_cluster_version" and "Ocr_element_version." Note the various tables contain a field called "template_package_id" that provides the link or relationship to the "Template_package" table. This table is associated with each of these other version tables by a 1-m relation.

| | | Template_package |
|---|---|---|
| Name | Type | Description |
| Id | String | Unique identifier for every template package record |
| Version | Integer | Version number of the template package |
| Created | String | The date it was created |
| Active | String | Flag representing if this template package is active or not |

Trn: This table stores the Visa Net transactions performed for the OSU device 10. It is linked to "Osu" table through a 1-m relation.

| | | Trn |
|---|---|---|
| Name | Type | Description |
| Id | String | Unique identifier for every transaction record |
| Osu_id | Integer | Osu id to which this transaction record is linked |
| Returned_aci | String | Returned requested authorization characteristics indicator |

-continued

Trn

| Name | Type | Description |
| --- | --- | --- |
| Store_number | String | Number assigned by the signing member, processor to identify a specific merchant store within the VisaNet system |
| Terminal_number | Integer | Number assigned to identify a unique terminal within a merchant location |
| Auth_source | Character | Source of the authorization code |
| Trans_sequence | Integer | Terminal generated transaction sequence number |
| Response_code | String | Code indicating the status of the authorization request |
| Approval_code | String | Authorization code when a transaction has been approved |
| Local_trans_date_time | String | Date and time when the transaction took place |
| Auth_response | String | Response or display text message |
| Avs_result | Character | Avs Result |
| Retrieval_ref_number | String | Transaction retrieval reference number returned by the authorizing system |
| Market_data_identifier | Character | Industry specific data being submitted |
| Trans_id | Integer | Visa transaction identifier or Master Card reference number |
| Validation_code | String | Specific information generated by the card issuer |
| Group_ver | Integer | Addendum data group version number |
| Committed | Character | Flag representing if the transaction has been committed or not |

Whenever the configuration of an OSU device 10 is changed by the vending machine operator or Davis system administrator executing an update, a new version for that device is created and is added to its version table(s). At the same time, the "Template_package" table is updated. When an OSU device 10 connects to the system, its current configuration version number is supplied and is checked against the version number present in "Template_package" table. If the number present in the table is greater than the one sent by the device, that device requires an update. The latest configuration data is then retrieved from the database 70 by reviewing all the version tables discussed above. An update package is then created for and sent to the device. If the version numbers match, meaning no change is necessary in the configuration of the device, the server cluster 18 checks to see if a (new) template needs to be added to or deleted from that device's configuration file, and again an update package is created and sent accordingly. Update packages are created and sent to the devices in a format specified by the DTP protocol as explained earlier.

Control and management of the system occurs at management console 22, which was explained in some detail earlier. It is from this console that new data is entered onto the system, such as new or improved templates for the OSU devices 10, or new configuration updates for the OSU devices 10. Console 22 may also be used to add new OSU devices 10 to the system. System information may also be retrieved to console 22. For example, console 22 can obtain updates sent from the OSU devices 10, retrieve a template list supported by any OSU device 10, or delete templates from an existing OSU device 10.

Of course, database 70 also preferably includes data files for each of the consumers who have either pre-registered to use the system, or who have used the system. Such consumer files may contain important information about the consumer, such as their names and addresses, information regarding their registered accounts or actual storage of the accounts, and may also contain information that might make subsequent processing of the consumer's information easier. For example, once a consumer's date of birth has been assessed, it can be stored. Thereafter, if the system determines (through OCR) that a particular customer has requested to make a purchase, that consumer's file can be analyzed and, for example, the date of birth retrieved, making further OCR processing of the license potentially unnecessary.

In addition to the table definitions described above, in a commercial system, there may be over 100 tables in database 70 that are used to support and collect audit data, often referred to in the art as DEX or EVA data, and which was briefly discussed earlier. For more information concerning these DEX related data constructs, the reader is referred to "European Vending Association Data Transfer Standard," European Vending Association, Release 5.0, July 1999, which is hereby incorporated herein by reference for all that it teaches.

B. Update Payload Information

As has been discussed previously, it may be necessary to update the templates or other configuration information resident in the OSU 6 for optically analyzing a given license. Below is shown an example of the payload information that is sent by DTP to an OSU 6 to provide an update to such information, i.e., a Type 7 "Update Response" packet. This example shows only a representation of the payload of data and does not otherwise show DTP header or other supporting information that will also be sent with the Update Response packet. As mentioned earlier, the payload will ultimately be stored in the OSU 6, preferably in Flash 232.

As one skilled in the art will recognize, the payload information is organized in hierarchical data structure, as opposed to the relational database format used to organize the data structures in the database 70 associated with server cluster 18 (see FIG. 10). In other words, the payload information is organized in a "tree format," with one data structure referencing another and so on. Thus, the "Form" data structure references a data structure called "Point," which is has its own data structure, and so on. It will also be appreciated by those of ordinary skill that multiple versions of the data structures listed below will like be sent in a given application. For example, "Cluster N" will be sent for every N clusters of interest in the form, and "Element N" will be sent for every N elements of interest within a particular cluster.

Preferably, each Update Response packet contains configuration information for a single form. Thus, if it were necessary to fully update the OSU 6 to provide image templates and other supporting OCR data for the states of Texas and Louisiana, at least two Update Response packets would be sent.

One or more update responses may be sent to the OSU device to complete a fall upgrade. The first byte of the update response payload determines the extent of the update that is to occur at the OSU 6. If the first byte equals "00," the font information will be updated or added if it doesn't presently exist. If the first byte equals "01," this is interpreted by the OSU 6 as an instruction to delete a font residing in the OSU 6. If the first byte equals "1X," the form header templates stored in the OSU 6 are implicated, with "10" designating the replacing of an old template or the additional of a new header template, and "11" designating the deletion of a header template. If the first byte equals "2X," other form structure information is implicated, such as the cluster information, the cluster headers, the character templates for the elements, the pattern specifications, etc. Specifically, "20" designates and update or addition to such information, while a "21" designates a deletion.

Some of the data in the payload is variable in length. For example, the cluster list may contain several clusters or only a single cluster. For this reason, the cluster list data structure contains at its end an End Of Line ("EOL") marker to denote the boundary between that data structure and the next data structure in the payload.

Keeping the foregoing in mind, the Update Response payload is preferably represented as follows. Parenthetical description are used to tie the various data structures to concepts introduced earlier in this specification:

"Form":

name (e.g., Texas driver's license)

"Header"

"Point" (The reference point for the form. It is the pixel location where (x,y)=(0,0))

"Clusterlist" (a list of the clusters within the form)

"Header": (represent both form and cluster headers)

name (e.g., "Texas" or "Texas date of birth")

"Region" (defines the expected location of the header on the form as a rectangle, thus providing the header origin)

header image name (identifies the name of the "Header Image" data structure. I.e., this name points to the correct header image data structure)

"Region":

"Point" (top left corner)

"Point" (right bottom corner)

"Point": (specifies a particular pixel)

X (16 bits)

Y (16 bits)

"Clusterlist": (a list of clusters associated with the form)

"Cluster 1"

"Cluster 2"

"Cluster N", etc.

"EOL"

"Cluster N":

"Header"

"Point" (i.e., the cluster header origin or pixel locate that is remapped to be (x,y)=(0,0) for the cluster reference point. Offset values for OCR Elements are calculated relative to this point.)

"Elementlist" (a list of elements associated with the cluster)

"Elementlist": (a list of elements associated with each cluster)

"Element 1"

"Element 2"

"Element N", etc.

"EOL"

"Element N":

name (e.g., 6-digit date of birth)

"Region" (defines expected location of the element, i.e., the element origin, with necessary variance as explained earlier)

"Pattern"

"Font" (specifies the font type for the element)

"Pattern": (defines the pattern specification)

pattern length (16 bits) (defines the number of pattern characters in the pattern specification, e.g., 5 for a 6-digit date of birth. Note: this length obviates the need for an "EOL" marker)

"Pattern Character 1" (e.g., the month for the date of birth, i.e., N[1:2])

"Pattern Character 2" (e.g., "-")

"Pattern Character N", etc.

"Pattern Character N":

"Character Type" (a one byte variable that specifies a particular character type, e.g., "N" for numbers, "A" for capital letters, etc.)

number (a one-byte variable that tells the minimum and maximum number of characters to look in the particular pattern character)

"Header Image": (i.e., the header templates)

name colnum (16 bits) (specifies the number of columns in the template)

rownum (16 bits) (specifies the number of rows in the template)

data (pixel data)

"Font":

name

"Font Type List"

"Font Type List": (lists the various types of fonts, e.g., Courier 12 pt., Arial 10 pt., etc.)

"Font Type 1"

"Font Type 2"

"Font Type N", etc.

"EOL"

"Character Type N":

Type (a byte that specifies the type of characters stored in the associated list. E.g., A=upper case letters (A–Z), a=lower case letters (a–z), N=numbers (0-9), P=punctuation and symbols e.g., "-/;:!?( )[ ]{ }%$, Z=any upper or lower case letter, X=any letter or number, *=wildcard (any character, S=space)

"Character Template List"

"Character Template List":

"Character Template 1" (e.g., may represent the template for the number "0" or the letter "A")

"Character Template 2" (e.g., may represent the template for the number "1" or the letter "B")

"Character Template N", etc.

"EOL" (null terminated string)

"Character Template N": (i.e., the character templates)

name colnum (16 bits) (specifies the number of columns in the template)

rownum (16 bits) (specifies the number of rows in the template)

data (pixel data)

V. Modifying a Preexisting Vending Machine to Incorporate an OSU/OSU Architecture One of the advantages of the disclosed system is its ability to work with preexisting vending hardware. Only slight modifications are needed to retrofit such pieces of equipment with the OSU 6 disclosed herein. How such modifications are made to a standard vending machine is disclosed as illustrative of this process, but similar techniques would be used to modify other pieces of equipment, as one skilled in the art will recognize. The structure, functionality, and operation of such standard vending machines is also discussed in U.S. patent applications Ser. Nos. 09/836,805 and 09/851,198, which are incorporated by reference herein in their entirety, and which are assigned to the present assignee.

Figure 12:
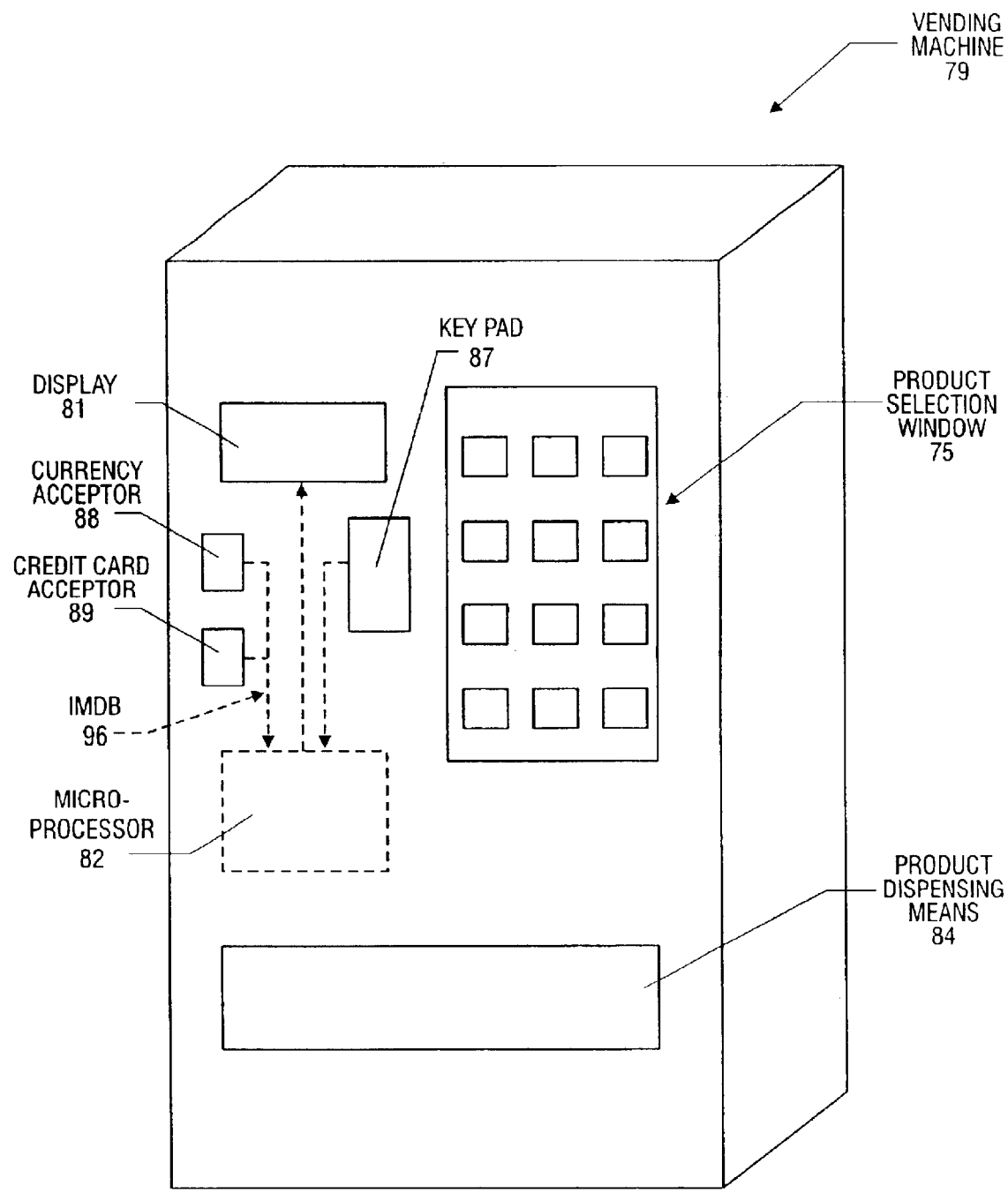
FIG. 12 shows a prior art vending machine.

FIG. 12 shows a typical vending machine 79, including a display 81, a keypad 87 for making selections in the machine, a product dispensing mechanism 84 (typically a hinged door), a product selection window 75, and (internally) a microprocessor 82. Also present are a currency acceptor 88, which receives paper or coin money, and a credit card acceptor 89. (One skilled will realize that in an actual embodiment, the currency acceptor 88 would likely constitute two separate acceptors to handle the two different types of currency. Furthermore, other standard vending machine components, not necessary to facilitate the discussion of the invention, are not disclosed). Also shown in FIG. 12 is the International Multi Drop Bus (IMDB) 96, which supports a communication protocol usable in standard vending machines. In the standard vending machine, microprocessor 82, through the IMDB 96, polls payment devices 88 and 89 to see if payment has been made. In a standard vending machine, once payment has been made, the product may be vended.

Figure 13:
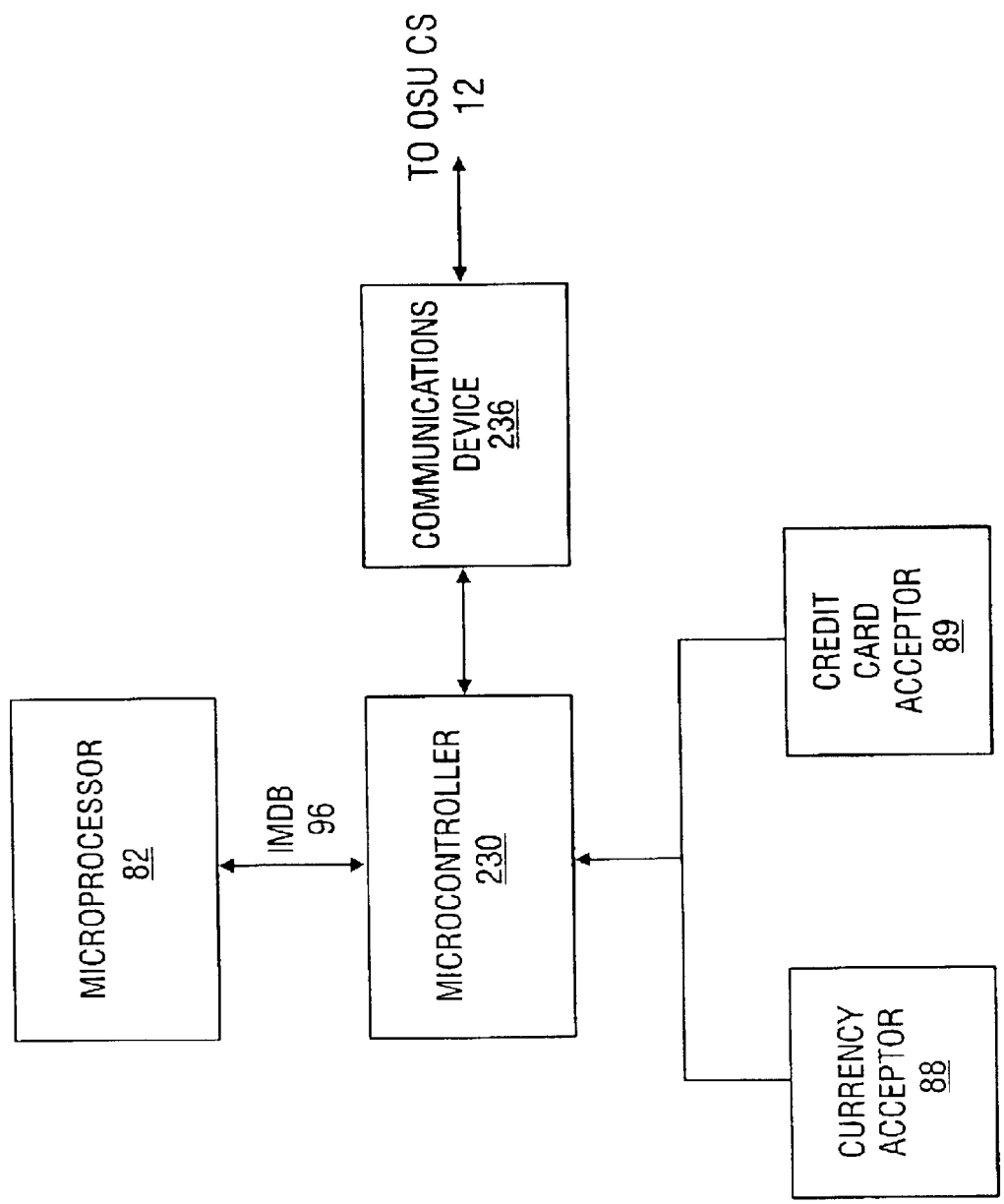
FIG. 13 shows a modification to the circuitry of the vending machine of FIG. 9 to accompany an OSU.

However, in a vending machine retrofitted to include a OSU 6, vending of the product is, at least in some embodiments, only to be made upon verification of certain consumer information, such as his age or the validity of his driver's license. For this reason, the vending machine logic is preferably modified as shown in FIG. 13. In this figure, microcontroller 230 (see also FIG. 6) has been inserted between the microprocessor 82 and the payment devices 88 and 89. (In this disclosure, for convenience and clarity, the control device within the OSU 6 is referred to as a "microcontroller," while the control device on the vending machine is referred to as a "microprocessor." However, as one skilled in the art will realize, these two devices are interchangeable as both microcontrollers and microprocessors perform similar functions). The microcontroller 230 is also in communication with a communication device 236, such as a modem, which in turn is connected to an OSU CS 12 as described above. (Of course, a modem is merely an exemplary way of providing communication, and any other suitable form of communication, e.g., wireless or optical cable, is also contemplated). Before allowing a purchase, the microcontroller 230 waits for the results of the OSU analysis to determine if the condition for purchase (e.g., age) has been met. If this condition is met, and if payment has been made at either of payment devices 88 or 89, then the vend will be made via the product dispensing mechanism 84. The microcontroller 230 must be operated in a fashion such that the microprocessor 82 doesn't know that the IMDB bus 96 has been disconnected from the payment devices 88 and 89, and therefore will send mock polling data on bus 96 for this purpose. Additionally, the microcontroller 230 must now perform the function of polling the payment devices 88 and 89, just as did the microprocessor 82 before the retrofit.

Figure 14:
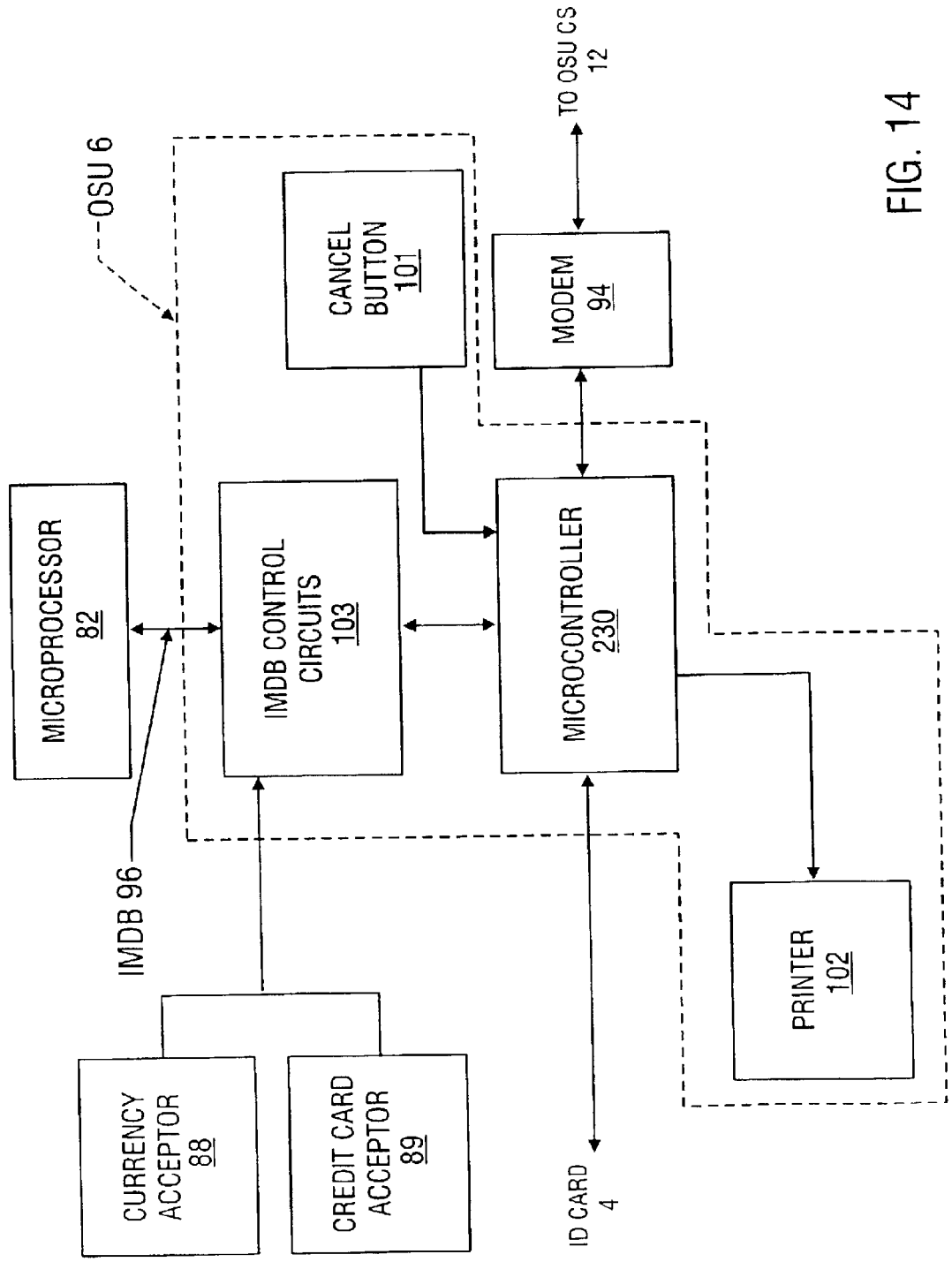
FIG. 14 shows a schematic of the circuitry of a vending machine modified to accompany an OSU.

FIG. 14 shows further details concerning the relation of microcontroller 230 in a vending machine retrofitted with an OSU 6. Other desirable features integrated with the OSU 6 are also shown, such as a cancel button 101, which allows the consumer to cancel a transaction already in progress, and a printer 102, capable of printing truncation receipts. Also present in FIG. 14 are IMDB control circuits 103 that handle the disconnection and polling of the IMDB 96 as explained earlier, and which are present on the printed circuit board along with microcontroller 230, flash 232, and SRAM 234.

In the retrofitted device, the microcontroller 230 essentially becomes the master processor and largely takes control over the native microprocessor 82 already present in the vending machine, although the microprocessor 82 will continue to run other normal vending machine functions, such as running the machine's dispensing motors and display 81. The microcontroller 230 directly communicates with the communication device 236, the cancel button 101, the payment devices 88 and 89, and the printer 102. The microcontroller 230 also controls the IMDB bus 96 through IMDB control circuits 103. To the extent that the microprocessor continues to run local systems functions like enabling the vending of products, it does so through receipt of commands from microcontroller 230. Microcontroller 230, when operating in an "off-line" mode, can make decisions concerning allowing or not allowing a purchase. When operating in an "on-line" mode, microcontroller 230 receives instructions from the server cluster 18 through the communications device 236 concerning allowing or not allowing a purchase.

While the disclosed embodiment shows a traditional vending machine retrofitted with an OSU, one could of course build in accordance with the teachings in this disclosure an OSU device 10 from scratch containing an OSU. In such OSU original models, the architecture and circuitry could be arranged in any number of ways to achieve suitable functionality, as one skilled in the art will immediately recognize. For example, it would probably be beneficial in an OSU device 10 designed from scratch to combine the functionality of the verification controller 93 and the microprocessor 82 into a single microprocessor, and perhaps to dispense with the use of the microcontroller 230 IMOB bus 96 altogether. Likewise, it may be desirable for the microcontroller 230 to be positioned outside the OSU, or to reprogram an existing microprocessor 82 to perform the functions of the microcontroller 230 as disclosed herein.

VI. System Installation and Initialization

Suppose a vending machine operator, Bob's Beverages ("Bob"), purchases a Davis system enabled beverage vending machine equipped with an OSU 6. Bob desires to sell alcoholic beverages from the machine in a hotel/casino in Las Vegas, Nev. Bob, using a web browser on the public internet, e.g., from his interface 20, goes to the Davis system 8 website and "logs in" to a secure portion of the site using the user name and password that he received either when earlier registering with the system on-line or when he purchased the machine. Bob then creates a vending machine pool on the website and adds one machine to it—the machine scheduled for delivery to the hotel. He enters data about the new vending machine to register it with the system, such as its unique identification number, machine type, location, etc.

Bob may then uses the on-line machine configuration editor to set machine and OSU 6 operation parameters, i.e., Bob creates a configuration file for his machine on-line. For example, Bob may review what types of ID card templates are currently supported by the system and may select which of those will be accepted by his machine. Thus, if the system currently supports 100 ID types, including 50 state driver's licenses type, Bob may choose all ID types or some subset of these to be supported by his machine. This ID type selection process will allow the templates for the selected ID card types to eventually be sent by the system to the OSU 6 in Bob's machine. With the configuration editor, Bob may also configure other functional aspects of his machine. For example, Bob may specify that periodic audits be scheduled for his machine, e.g., that DEX/EVA information be sent daily at 2:00 am. He may also specify that only certain product selection window 75 rows will be used to sell age restricted alcoholic beverages, and therefore that the consumer's age will need to be verified by the system to vend products from these rows. He may further configure the system to accept either cash, coin, and credit card payment methods, and may require credit card information to be supplied by the consumer to provide further validation of the consumer's identity. After setting the relevant machine configuration parameters, Bob may now "log out" from the site.

When the machine arrives at the hotel/casino location, Bob plugs it in and connects it to a telephone jack. At this point, the OSU 6 in the machine begins an initialization phase that preferably is factory pre-programmed into the machine, preferably in Flash 232. The machine accordingly dials a stored phone number to connect to the Davis system 8, and more specifically and preferably to a designated initialization computer connected to the system 8. That computer receives the call by modem, answers it, and notifies a relevant OSU-CS 12 on the system (e.g., one in the vicinity of the machine) that a connection is being attempted. The OSU-CS 12 attaches to the connection and requests security credentials from the OSU 6, again which are pre-programmed. The OSU-CS 12 then in secure fashion authenticates the OSU 6 as a new vending machine for the Bob's Beverages account, e.g., by verifying the ID code for the machine. Thereafter, a connection is established with the server cluster 18, thereby establishing a "session" as described earlier. The Davis session is responsible for maintaining dialogue with the OSU 6, via the OSU-CS 12, and for performing services on behalf of the OSU 6. In this case, i.e., during the initialization phase, the OSU 6 needs to be updated with the latest software and ID card support.

The OSU 6 makes an "Update Request" to the server cluster 18, which is initially transmitted to the OSU-CS 12 using the DTP protocol described earlier. The OSU-CS 12 receives the packet and accordingly requests the server cluster 18 to provide a data structure for the updates. The server cluster 18 in turn creates an EJB (Enterprise Java Bean, per the Java 2 Enterprise Edition platform defined by Sun Microsystems) to perform the service. This EJB then accesses system data to create an "Update Response" packet. During initialization, Bob's previously created configuration file is consulted to understand the functionality that is needed at Bob's machine. For example, in accordance with the configuration file, Bob may receive the necessary templates to perform template matching and identification for all 50 states, and may receive further template data for these states to read and interpret the date of birth on the license to verify the consumer's age. The "Update Response" is returned to the OSU-CS 12, which in turn repackages the data into a DTP packet and sends the data to the OSU 6 as described earlier. The OSU 6 then updates itself with the new data, preferably by storing it in Flash 232. The server cluster 18 then receives notification from the OSU 6 that the upgrade completed successfully. Optionally, the server cluster 18 may send an e-mail to Bob's user interface 24 to confirm the completion of the update procedure.

At this point Bob is ready to stock his machine and put it into operation. Suppose a 43-year-old hotel guest from Texas passes by the machine and decides to purchase a beer. He makes his selection and is prompted by the display 81 to swipe his credit card into credit card acceptor 88 or insert cash into currency acceptor 88. The consumer chooses to insert his credit card and then is prompted to insert his driver's license into OSU 6. He does so and in a few seconds receives his license back. A few seconds later, after locally performing the license and birth identification procedures outlined earlier, the display 81 states "purchase successful" and his can of beer is dispensed. By contrast, a 17-year-old hotel guest from Colorado passes by the machine and tries to purchase a beer. He makes his selection and inserts a five-dollar bill when prompted. He then insert his drivers license. After failing the age verification procedure, the display 81 may state "Purchase denied. Must be 21 for purchase. Please make another selection." That consumer then may select a soda for purchase, or may receive his five dollars back by aborting the transaction and selecting a change return option.

Assume many other purchases are made throughout the day. Then, at 2:00 am the next morning, and pursuant to Bob's desires as reflected in his downloaded configuration file, the machine dials the server cluster 18 via OSU CS 12 and uploads its DEX information. In the morning, Bob checks his e-mail and may find a received message from the system 8 saying that his machine was successfully audited. The message also preferably provides a link to the audit information. Bob may then click on the link and log into the Davis system where he may view the audit report for his new machine. From this report Bob may review detailed information concerning each information field collected by the DEX feature. For example, he can view information about each transaction, he can determine his inventory in the machine, see what product is most popular, "when" it is most popular, at what price, etc. After one week, Bob generates a location report to show hotel management how successful the machine has been with consumers. Based on its success, he receives approval to place one machine on each of the hotel's 50 floors plus 9 additional units throughout other areas of the hotel and casino.

Bob then purchases, configures, installs, and stocks the new machines as outlined above, bringing the total of Bob's machines at the hotel to 60. Ultimately Bob may expand his presence into other regions with many other machines, all of which can be easily managed and tracked using the disclosed system 8. Importantly, Bob may also have his machines automatically updated with the latest software and image templates to further improve the functionality of his machine.

VII. Other Embodiments

While this disclosure has primarily focused on the vending of age-restricted products as an illustrative embodiment, the technology disclosed in the system is capable of vending other products and services in a reliable and efficient manner, and performing other useful tasks.

An important advantage of the system stems from its ability to treat ordinary ID cards, such as driver's licenses, as "smart cards," even when those cards do not contain means for electronically holding consumer information, such as magnetic strips or integrated circuits. In conjunction with the use of a personal identification (PIN) number, the ordinary driver's license, or any other ID card issued in any jurisdiction, opens the consumer to an enhanced ability to electronically purchase items and services, and without the need for vendors to issue specialized and expensive smart cards, which are usually only useful for purchasing a particular vendor's product.

Thus, the Davis system provides a convenient, low-cost, platform that provides "smart card" functionality. Furthermore, OSU devices 10 can easily be present at or incorporated in merchant point-of-sale equipment, building entrances, vending machines, cars, pay phones, personal computers, gas pumps, and personal data assistants (PDAs), enabling the consumer to use such devices with only his driver's license or other ID card. Indeed, a Davis system may contain several of these types of terminals (e.g., vending machines and gas pumps) in one network.

Here are some examples where the disclosed technology is expected to be useful:

Law Enforcement: A police vehicle equipped with an OSU allows a driver's license to be scanned. If the system includes or is connectable to a law enforcement system, information concerning the driver's record could be verified on the spot, and without the necessity of keying drive license data into a computer.

Vehicle Rental: Cars equipped with OSU devices could be rented, perhaps without the assistance of a rental car attendant. In one embodiment, cars could be directly equipped with OSUs which communicate with the Davis system by wireless means. The license could then be verified as valid. Additionally, and if the consumer does not already have an account on the system capable of paying for the rental, the consumer could be asked to insert his credit card, either as an extra validation measure or to pay for the rental or both. Approval of both the license and the credit card would then allow the car to be started, either automatically or by turning the ignition key. (After payment has been arranged, only insertion of the driver's license would thereafter be necessary to start the car). Such a system is particularly advantageous because it allows validation of the driver's license, ensures that the license was not suspended or revoked (if linked to a law enforcement system), and allows a means for payment via the ID card, making the rental process a quick and fully automated procedure. As an alternative, an OSU-equipped vending machine could be used to dispense keys after license (and perhaps credit card) validation in much the same way.

Automated Forms Processing: Standard forms, such as insurance cards, could be scanned in order to automate data entry of the information contained thereon. Manual data entry is by comparison slow and error prone.

Security Card: High security areas, such a building entrances, parking garages, certain rooms within a building, etc., when equipped with an OSU, would allow or disallow access (e.g., by locking or unlocking doors or gates) merely upon an assessment of a driver's license, and without the need to issue special access cards.

Check Cashing/Credit Card Transactions: OSU devices 10 connected to the Davis system could be used as an extra security check to verify the identity of those presenting licenses to support the cashing of a check or those using credit cards to make a purchase.

Gas Pumps: A gas pump equipped with an OSU could not only be used to vend the gas and pay for the purchase, but could also allow the license to be checked for validity if interfaced with an appropriate law enforcement system. If the consumer's license is determined not to be valid or has been suspended or revoked, the purchase could be disabled, with the tangential benefit of keeping unlicensed drivers from driving. Additionally, the system could be programmed to receive periodic updates (e.g., daily) from the law enforcement system concerning license status (suspended, revoked, valid), which could then be stored in database 70. In this embodiment, the system would not need to query the law enforcement system each time a consumer made a purchase request, but could instead maintain a file on database 70.

Validation of Passports and Visas: If the OSU devices 10 were fitted with flat bed scanners, or a modified version of the OSU 6, they could be used to allow passports and visas to function in much the same way as driver's licenses or other ID cards as disclosed herein. Thus, customs or other officials could employ such OSU devices 10 to verify such information on the spot for travelers and other persons. Thus, the Davis system to which the OSU devices are connected could be connected to government agency databases to verify that the passport or visa is valid, contains the correct information, and has not been tampered with. In such an application, the OSU could be used to determine, by OCR, the traveler's name, and this name could be sent by the system to a government agency database, to pull other desired information for the individual, such as his immigration status. Additionally, and in conjunction with the proper database, background or criminal checks could be run. If necessary, the photo on the passport or visa (if any) could be sent in real time to personnel at these agencies for a manual photo check. This may be useful in the apprehension of terrorists, missing persons, and criminals. Additionally, future technologies may allow for passport photos to be pre-scanned and stored, possibly allowing template matching of the faces stored on the scanned and stored ID photos.

Locating Criminals: In another embodiment, certain drivers containing suspended or revoked licenses, or which have criminal records, could have their licenses "hot listed" in the system by law enforcement officials. When such licenses were used at any OSU device 10 connected to the system, special procedures could be put in place by the system which would immediately notify law enforcement agencies of the time, date and location in which the purchase was completed or attempted, with the hope that such persons could more easily be brought to justice. Additionally, such information could be stored in the system and made accessible for law enforcement officers to review at their leisure. Such an OSU device 10 might be especially well-suited for installation at airports, where passenger identities could be verified. Thus, when a passenger checks in at the airport he would be required to insert his drivers license into an OSU device 10, which in turn could be connected to a national database to check if the person was on a "watch list."

License plate capture: In another embodiment, an automobile license plate image could be captured and processed. An OSU 6 can be embedded with or connected to an image capturing device, such as a video camera or motion-sensitive still image camera. Using such a device, license plates could be optically captured by law enforcement officers (e.g., to nab speeding drivers) and automatically processed to tap into information databases containing, for example, vehicle registration information. Such a device could also be used in parking garages to capture information about who is entering and exiting the garage, or to authorize access.

Tamper-proofing Photos: In another embodiment, an ID card photo image can be compared with the original photo when the ID card was created. After a person is issued an ID card, the image is stored in an database connected to a Davis system. As the person uses the card in an OSU device, the two are compared. Specific points or the entire image can be compared to determine if the image has been significantly altered.

As well as having other uses, the disclosed system may be implemented in a number of different ways depending on the desired system functionality. Databases and/or servers could be combined with OSU devices. Other components disclosed herein as being integrated could also be separated if desirable. The specific hardware components could be easily changed or altered by those of ordinary skill. Furthermore, the system may be used to vend a wide array of products and services. For example, some of the OSU devices 10 could be configured to vend age-restricted products, while other OSU devices 10 on the system could be configured to act as ATMs, security monitors, gas pumps, etc. The disclosed system therefore has great flexibility.

Moreover, the use an OSU is not strictly necessary to realize some of the benefits that are disclosed herein. Other suitable means for receiving consumer information, e.g., such as by computer or keypad, or through electronic means such as by credit cards containing magnetic strips or smart cards containing integrated circuitry, may be useful in certain novel aspects as disclosed herein. In this vein, it should be noted that the disclosed systems and associated methods are believed to be patentable in several different respects, and with respect to several of its components and/or subcomponents, even if the benefits of these other inventive aspects have not been specifically touted in this specification.

The concept of storage of data within a memory refers to storage in any suitable means for retaining digital data, such as in a memory chip or on a magnetic disk. References to multiple memories in the appended claims, such as a first memory and a second memory, should be understood as referring generally to storage in separate discrete memory devices, or storage on a single device in different memory locations, registers, or blocks within the same memory device.

From the foregoing detailed description of specific embodiments of the invention, it should be apparent that a system and associated methods for vending products and services using an identification card has been disclosed. Although specific embodiments of the invention have been disclosed herein in some detail, this has been done solely for the purposes of illustrating various aspects and features of the invention, and is not intended to be limiting with respect to the scope of the invention. It is contemplated that various substitutions, alterations, and/or modifications, including but not limited to those design alternatives which might have been specifically noted in this disclosure, may be made to the disclosed embodiment without departing from the spirit and scope of the invention as defined in the appended claims.

What is claimed is:

1. A method for allowing a consumer to pay for a good or service having a purchase price at a vending machine using a system, the method comprising:
   (a) receiving at the system consumer account registration information to establish at least one electronic consumer account accessible by the system;
   (b) receiving a form containing information about the consumer into the vending machine, wherein the form constitutes one of a plurality of forms receivable by the system;
   (c) optically analyzing the form to electrically determine which one of the plurality of different types of forms has been received at the system and to determine information about the consumer; and
   (d) using the information to electronically charge the purchase price from the at least one consumer account.

2. The method of claim 1, wherein establishing an electronic consumer account comprises communicating with the system using a computerized user interface.

3. The method of claim 1, wherein the form is selected from the group consisting of an identification card, a driver's license, a social security card, and a passport.

4. The method of claim 1, wherein optically analyzing the form comprises scanning the form to produce an image and comparing the image to image templates.

5. The method of claim 1, wherein the determined information is selected from the group consisting of the consumer's age, date of birth, name, address, identification number, driver's license number, social security number, and passport number.

6. The method of claim 1, wherein the at least one consumer account comprises a credit card account.

7. The method of claim 1, wherein the at least one account resides on an integrated system in communication with the system.

8. The method of claim 1, wherein the at least one account comprises a plurality of accounts, and further comprising allowing the consumer to select one of the plurality of accounts prior to using the information to electronically charge the purchase price from the at least one consumer account.

9. The method of claim 1, further comprising enabling the consumer to enter a private key prior to charging the at least one consumer account.

10. The method of claim 1, wherein the form does not comprise a credit or debit card.

11. A method for determining information about a consumer prior to enabling a vending of a good or service from a machine, comprising:
   (a) receiving a form containing information about the consumer at the machine, wherein the form is one of a plurality of different types of forms receivable by the system;
   (b) optically analyzing the form to electronically determine which of the plurality of different types of forms has been received by the system and to electronically determine information about the consumer; and
   (c) enabling the vend on the basis of the information.

12. The method of claim 11, wherein the form is selected from the group consisting of an identification card, a driver's license, a social security card, and a passport.

13. The method of claim 11, wherein optically analyzing the form comprises scanning the form to produce an image and comparing the image to image templates.

14. The method of claim 13, wherein the image templates are transmitted to the machine by a system.

15. The method of claim 11, wherein the determined information is selected from the group consisting of the consumer's age, date of birth, name, address, identification number, driver's license number, social security number, and passport number.

16. The method of claim 15, wherein vending is enabled if the consumer is of a suitable age to purchase the good or service.

17. The method of claim 11, wherein the machine is selected from the group consisting of a vending machine, an automatic teller machine, a cash register, and a gas pump.

18. A method for determining information about a consumer prior to enabling the vending of a good or service from a machine, comprising:
   (a) receiving a form containing information about the consumer at the machine;
   (b) optically analyzing the form using optical character recognition algorithms to electronically determine information about the consumer and to authenticate the form, wherein optically analyzing the form comprises scanning the form to produce an image and comparing the image to image templates; and
   (c) enabling the vend on the basis of the information.

19. The method of claim 18, wherein the form is selected from the group consisting of an identification card, a drivers license, a social security card, and a passport.

20. The method of claim 18, wherein the image templates are transmitted to the machine by a system.

21. The method of claim 18, wherein the determined information is selected from the group consisting of the consumer's age, date of birth, name, address, identification number, driver's license number, social security number, and passport number.

22. The method of claim 21, wherein vending is enabled if the consumer is of a suitable age to purchase the goad or service.

23. The method of claim 18, wherein the machine is selected from the group consisting of a vending machine, an automatic teller machine, a cash register, and a gas pump.

* * * * *